(12) United States Patent
Naruse

(10) Patent No.: US 6,453,567 B1
(45) Date of Patent: Sep. 24, 2002

(54) TIRE POSITION DETECTING DEVICE AND WHEEL ALIGNMENT ADJUSTING DEVICE

(75) Inventor: Yutaka Naruse, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 8 days.

(21) Appl. No.: 09/617,833

(22) Filed: Jul. 17, 2000

(30) Foreign Application Priority Data

Jul. 16, 1999 (JP) .......................................... 11-203384

(51) Int. Cl.[7] ................................................. G01B 5/24
(52) U.S. Cl. ...................................... 33/203; 33/203.12
(58) Field of Search .............................. 33/203, 203.13, 33/203.12, 203.15, 203.16, 203.18, 755, 756, 203.17, 203.14

(56) References Cited

U.S. PATENT DOCUMENTS

| | | | | |
|---|---|---|---|---|
| 3,181,248 A | * | 5/1965 | Manlove ........................ | 33/203 |
| 4,236,315 A | * | 12/1980 | Curchod et al. .......... | 33/203.18 |
| 4,481,716 A | * | 11/1984 | Beissbarth ................ | 33/203.18 |
| 4,679,327 A | * | 7/1987 | Fouchey et al. .......... | 33/203.13 |
| 4,800,651 A | | 1/1989 | Hanlon | |
| 4,860,457 A | * | 8/1989 | Beissbarth ................ | 33/203.18 |
| 5,088,320 A | * | 2/1992 | Fukuda et al. ............ | 33/203.13 |
| 5,111,585 A | * | 5/1992 | Kawashima et al. ..... | 33/203.12 |
| 5,864,053 A | * | 1/1999 | Nozaki ........................ | 33/336 |
| 6,256,894 B1 | * | 7/2001 | Naruse et al. ............ | 33/203.12 |

FOREIGN PATENT DOCUMENTS

| | | | | |
|---|---|---|---|---|
| EP | 189721 A1 | * | 8/1986 | ................... 33/203 |
| EP | 0 816 801 A2 | | 1/1998 | |
| JP | 63165705 A | * | 7/1988 | ................... 33/203 |
| JP | 03096803 A | * | 4/1991 | ................... 33/203 |
| JP | 031184020 A | * | 5/1991 | ................... 33/203 |
| JP | 7-35652 | | 2/1995 | |
| JP | 9-280843 | | 10/1997 | |
| JP | 9-329433 | | 12/1997 | |

* cited by examiner

Primary Examiner—Diego Gutierrez
Assistant Examiner—Mirellys Jagan
(74) Attorney, Agent, or Firm—Sughrue Mion, PLLC

(57) ABSTRACT

A tire position detecting device which correctly and accurately detects a position of a wheel of a vehicle loaded on a wheel alignment adjusting device. A jig is mounted to a disk wheel flange of a wheel. A second wire for measurement is pulled out from a distance measuring device, and a second anchoring hardware is made to catch on a first anchoring hardware of the jig. When the second wire for measurement is pulled out from the distance measuring device, a shaft of a rotary encoder rotates by an amount corresponding to a pulled-out amount, thus enabling accurate and precise measurement of dimensions.

9 Claims, 33 Drawing Sheets

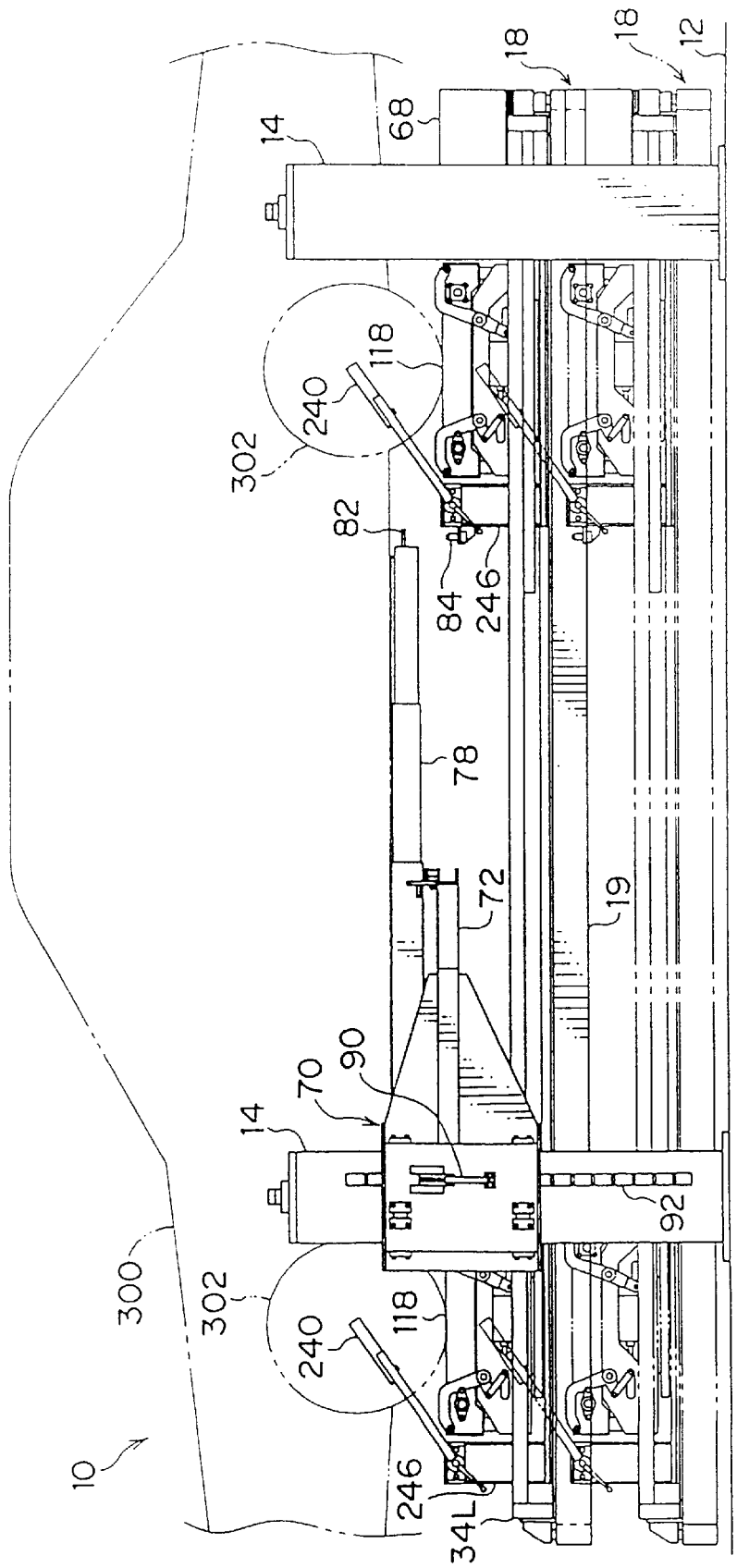

F I G. 1 4
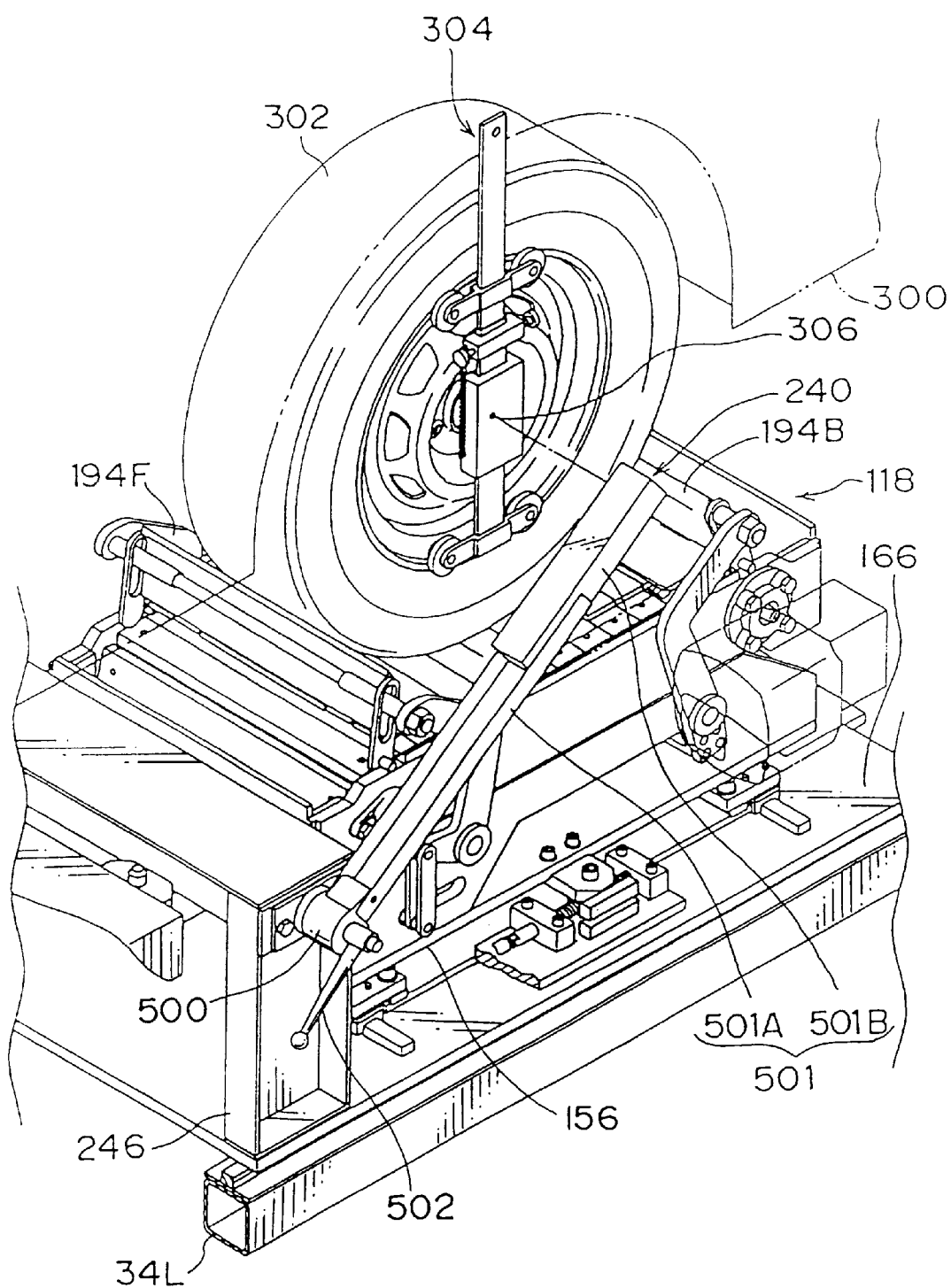

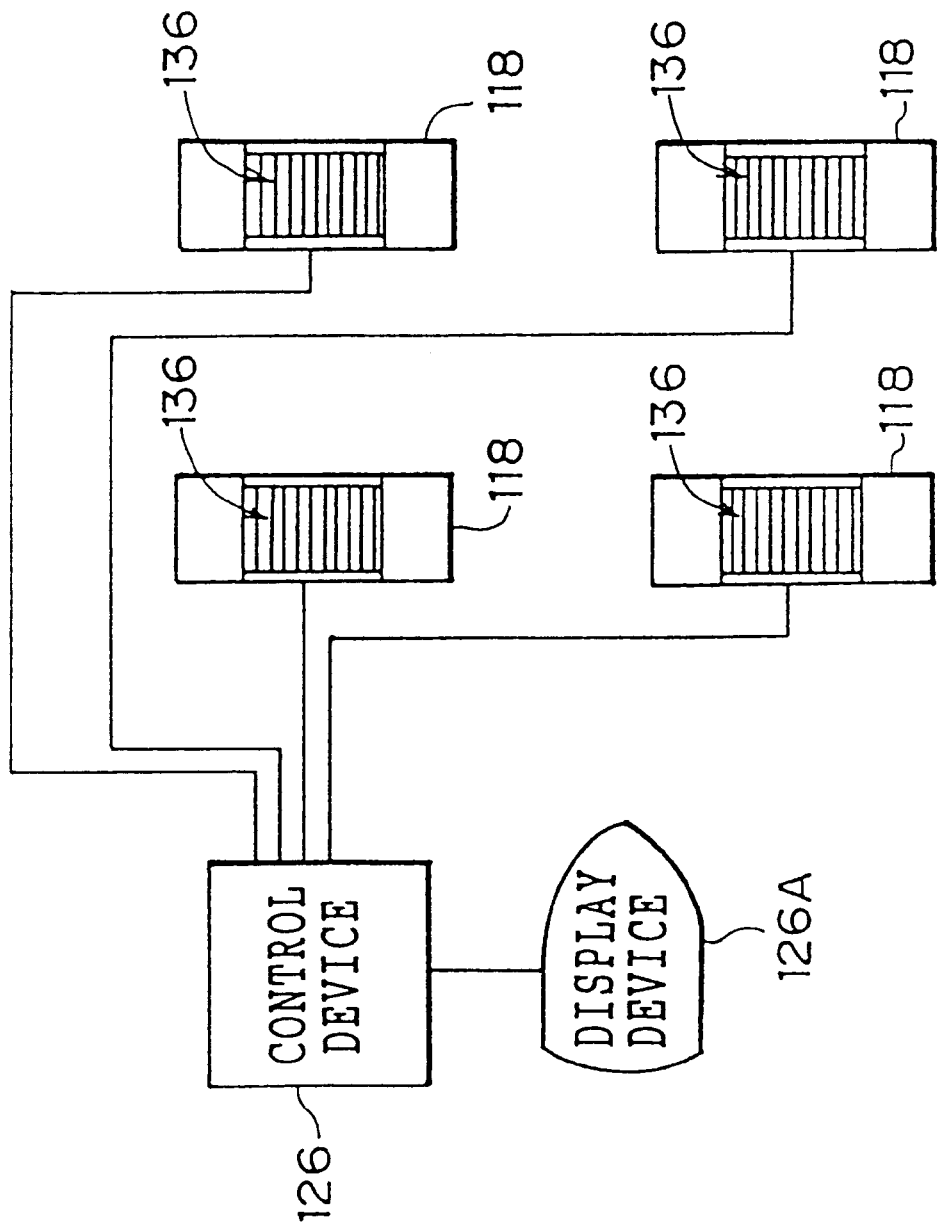

TIRE POSITION DETECTING DEVICE AND WHEEL ALIGNMENT ADJUSTING DEVICE

BACKGROUND OF THE INVENTION

1. Field of the Invention

The present invention relates to a tire position detecting device for detecting the position of a tire, and to a wheel alignment adjusting device for adjustment the alignment of wheels of a vehicle.

2. Description of the Related Art

Generally, wheels of a vehicle are provided with a camber angle for ensuring traveling stability of the vehicle, and are provided with a toe angle for preventing irregular wear caused by the provision of the camber angle.

Or, conversely, a toe angle is provided in order to balance the forces generated at the front tires and at the rear tires of the vehicle so as to ensure travelling stability of the vehicle, and the toe angle and the camber angle are combined so as to carry out adjustment for improving the traveling stability of the vehicle and minimizing the irregular wear of the tire under limiting conditions such as the structural dimensions of the vehicle and the like.

Accordingly, in order to improve the traveling stability and irregular wear resistance of the tire when the vehicle is traveling, it is important to adjust the toe angle and the camber angle, which are positional angles (wheel angles) applied to each wheel.

Adjustment of the toe angle and the camber angle is carried out by using a wheel alignment adjusting device.

When wheel alignment adjustment of a vehicle is to be carried out at a wheel alignment adjusting device, the vehicle is loaded onto the wheel alignment adjusting device from one end of the device, and is stopped at a predetermined position. The wheels are fixed, various measurements are carried out, and wheel alignment adjustment is carried out on the basis of the various measured values.

When various types of measurements are carried out, the center line of the wheel alignment adjusting device and the center line of the vehicle body must correspond with one another.

Thus, conventionally, the positions of the respective wheels have been measured by using a laser (e.g., Japanese Patent Application Laid-Open (JP-A) No. 9-280843, JP-A-9-329433), or by a potentiometer (JP-A-7-35652), or by a dial gauge. When the left and right dimensions differ, it is judged that the center line of the vehicle body does not coincide with the center line of the wheel alignment adjusting device. The positions of the loading stands on which the wheels are loaded are adjusted so that the position of the vehicle is corrected.

Conventionally, distance was measured by illuminating a laser onto the side surface of a tire or bringing a member into contact with the side surface of the tire. However, because there are indentations on the side surface of the tire and because the tire itself is made of rubber and deforms easily, errors in measurement are great for reasons such as the measured values are different each time measurement is carried out.

SUMMARY OF THE INVENTION

In view of the aforementioned, an object of the present invention is to provide a tire position detecting device, which can detect the position of a wheel precisely and with high accuracy, and a wheel alignment adjusting device.

A tire position detecting device of a first aspect of the present invention comprises a wheel-mounted jig which is mounted to a disc wheel of a wheel; and a position measuring device provided at a wheel loading portion on which the wheel is loaded, the position measuring device including: a connecting member, one end of the connecting member being pulled out from a predetermined position of the distance measuring device and being connected to a predetermined position of the wheel-mounted jig; and a sensor which measures a pulled out amount of the connecting member.

In the tire position detecting device of the first aspect, the wheel-mounted jig is mounted to the disc wheel of the wheel. The disc wheel is a substantially highly rigid body (i.e., is made of metal, and deforms less easily than the rubber forming the tire). Thus, the positional relationship between the wheel-mounted jig and the disc wheel when the wheel-mounted jig is mounted to the disc wheel is stable.

When the connecting member of the distance measuring device is pulled out and a predetermined position of the distance measuring device (a predetermined position of the wheel loading portion) and a predetermined position of the wheel-mounted jig are connected, the sensor measures the pulled out amount of the connecting member.

The wheel-mounted jig is mounted to a region of the wheel which is difficult to deform, namely, a stable region (the disc wheel). Thus, the predetermined position of the wheel-mounted jig is also a stable region. The sensor can accurately and precisely measure the pulled out amount of the connecting member which connects the predetermined position of the distance measuring device (the predetermined position of the wheel loading portion) and the predetermined position of the wheel-mounted jig.

In a second aspect of the present invention, in the tire position detecting device of the first aspect, the predetermined position of the wheel-mounted jig is on an axis of the wheel.

A unique point which is easy to specify does not always exist on the outer periphery of all disc wheels. However, the point at which the axis of the wheel and the disc wheel intersect, i.e., the central portion of the disc wheel, is a unique point only one of which exists on the disc wheel. Thus, this position is easy to specify, and is suitable as a reference for measurement.

In a third aspect of the present invention, in the tire position detecting device of either the first or second aspect, the connecting member is a wire.

Because the wire can be bent freely, the wire can be easily and compactly accommodated within the distance measuring device.

In a fourth aspect of the present invention, in the tire position detecting device of any of the first through third aspects, the position measuring device further includes: a pull out opening from which the wire is pulled out; an anchoring portion on which another end portion of the wire is anchored; at least one running pulley, a portion of the wire between the pull out opening and the anchoring portion being trained around the running pulley; and an urging device which urges the running pulley in one direction such that tensile force is applied to the wire.

In the tire position detecting device of the fourth aspect, when the wire is pulled out from the pull out opening, if one running pulley is provided, the running pulley is moved by an amount which is one-half of the pulled out amount of the wire. Accordingly, when the wire is accommodated within a fixed predetermined length of the distance measuring devices the amount of the wire which can be accommodated can be increased as compared to a case in which no running pulley is used. Also, flexible arrangement of the wire is possible.

Further, the running pulley is urged in one direction by the urging means. Thus, while the wire is pulled out from the pull out opening to the predetermined position of the wheel-mounted jig, the wire does not go slack, and the pulled out amount of the wire can be measured precisely and accurately.

By increasing the number of running pulleys even more, the amount of the wire which can be accommodated over a given length can be increased even more.

In a fifth aspect of the present invention, in the tire position detecting device of any of the first through fourth aspects, the sensor is a rotary encoder having a rotational shaft around which the wire is trained and which rotates due to movement of the wire, the rotary encoder outputting a signal corresponding to an amount of movement of the wire.

In the tire position detecting device of the fifth aspect, when the wire is pulled out, the rotary shaft of the rotary encoder is rotated, and the rotary encoder outputs a signal corresponding to the moved amount (the pulled out amount) of the wire. The moved amount of the wire can be known on the basis of this signal.

A sixth aspect of the present invention is a wheel alignment adjusting device comprising: (A) a wheel-mounted jig which is mounted to a disc wheel of a wheel; (B) a position measuring device provided at a wheel loading portion on which the wheel is loaded, the position measuring device including: (i) a connecting member, one end of the connecting member being pulled out from a predetermined position of the distance measuring device and being connected to a predetermined position of the wheel-mounted jig; and (ii) a sensor which measures a pulled out amount of the connecting member; (C) a moving device which moves the wheel loading portion in a horizontal direction; (D) a rotation device provided at the wheel loading portion and rotating the wheel; and (E) a force sensor connected to the wheel loading portion and measuring a force which is applied to the wheel loading portion.

In the wheel alignment adjusting device of the sixth aspect, the positions of the wheels loaded on the wheel loading portions can be measured by the respective tire position detecting devices.

The relationship between the central line of the vehicle body and the central line of the wheel alignment adjusting device can be known by measuring the positions of the respective wheels. At least one of the wheel loading portions is moved by at least one of the moving means such that the central line of the vehicle body and the central line of the wheel alignment adjusting device coincide with one another. The position of the vehicle body can thereby be corrected.

In a seventh aspect of the present invention, the wheel alignment adjusting device of the sixth aspect further comprises a control means for controlling the moving device to move the wheel loading portion on which a vehicle left front wheel is loaded and the wheel loading portion on which a vehicle right front wheel is loaded such that a pulled out amount of the connecting member measured by the distance measuring device corresponding to the vehicle right front wheel and a pulled out amount of the connecting member measured by the distance measuring device corresponding to the vehicle left front wheel are the same, and for controlling the moving device to move the wheel loading portion on which a vehicle left rear wheel is loaded and the wheel loading portion on which a vehicle right rear wheel is loaded such that a pulled out amount of the connecting member measured by the distance measuring device corresponding to the vehicle right rear wheel and a pulled out amount of the connecting member measured by the distance measured device corresponding to the vehicle left rear wheel are the same.

In the wheel alignment adjusting device of the seventh aspect, the control device controls the moving means to move the wheel loading portions on which the left and right front wheels are loaded such that a pulled out amount of the connecting member measured by the distance measuring device corresponding to the vehicle right front wheel and a pulled out amount of the connecting member measured by the distance measuring device corresponding to the vehicle left front wheel are the same. The control device controls the moving means to move the wheel loading portions on which the left and right rear wheels are loaded such that a pulled out amount of the connecting member measured by the distance measuring device corresponding to the vehicle right rear wheel and a pulled out amount of the connecting member measured by the distance measuring device corresponding to the vehicle left rear wheel are the same. In this way, the central line of the vehicle body and the central line of the wheel alignment adjusting device can automatically be made to correspond to one another.

In an eighth aspect of the present invention, in the fourth aspect, the pull out opening can be moved onto an axis of the wheel.

In a ninth aspect of the present invention, in the first aspect, the position measuring device has a first case and a second case, and one longitudinal direction end portion of the first case is fixed to a predetermined position of the wheel loading portion such that the first case is rotatable about the one longitudinal end portion, and the first case supports the second case such that the second case is movable in a longitudinal direction of the first case.

In a tenth aspect of the present invention, in the tire position detecting device of the ninth aspect, the second case includes: a pull out opening from which a wire is pulled out; an anchoring portion on which another end portion of the wire is anchored; at least one running pulley, a portion of the wire between the pull out opening and the anchoring portion being trained around the running pulley; and an urging device which urges the running pulley in one direction such that tensile force is applied to the wire.

BRIEF DESCRIPTION OF THE DRAWINGS

FIG. 1 is a side view, as seen from a left side of a wheel alignment adjusting device, illustrating a state in which a loading stand and a second sub-base are separated in the vertical direction.

FIG. 14 is a perspective view of the tire driving device, and illustrates a state in which a wheel is fixed.

FIG. 15 is a schematic structural view of a control system of the wheel alignment adjusting device.

DESCRIPTION OF THE PREFERRED EMBODIMENTS

An embodiment of the wheel alignment adjusting device according to the present invention will be described hereinafter with reference to FIGS. 1 through 33.

Figure 4:
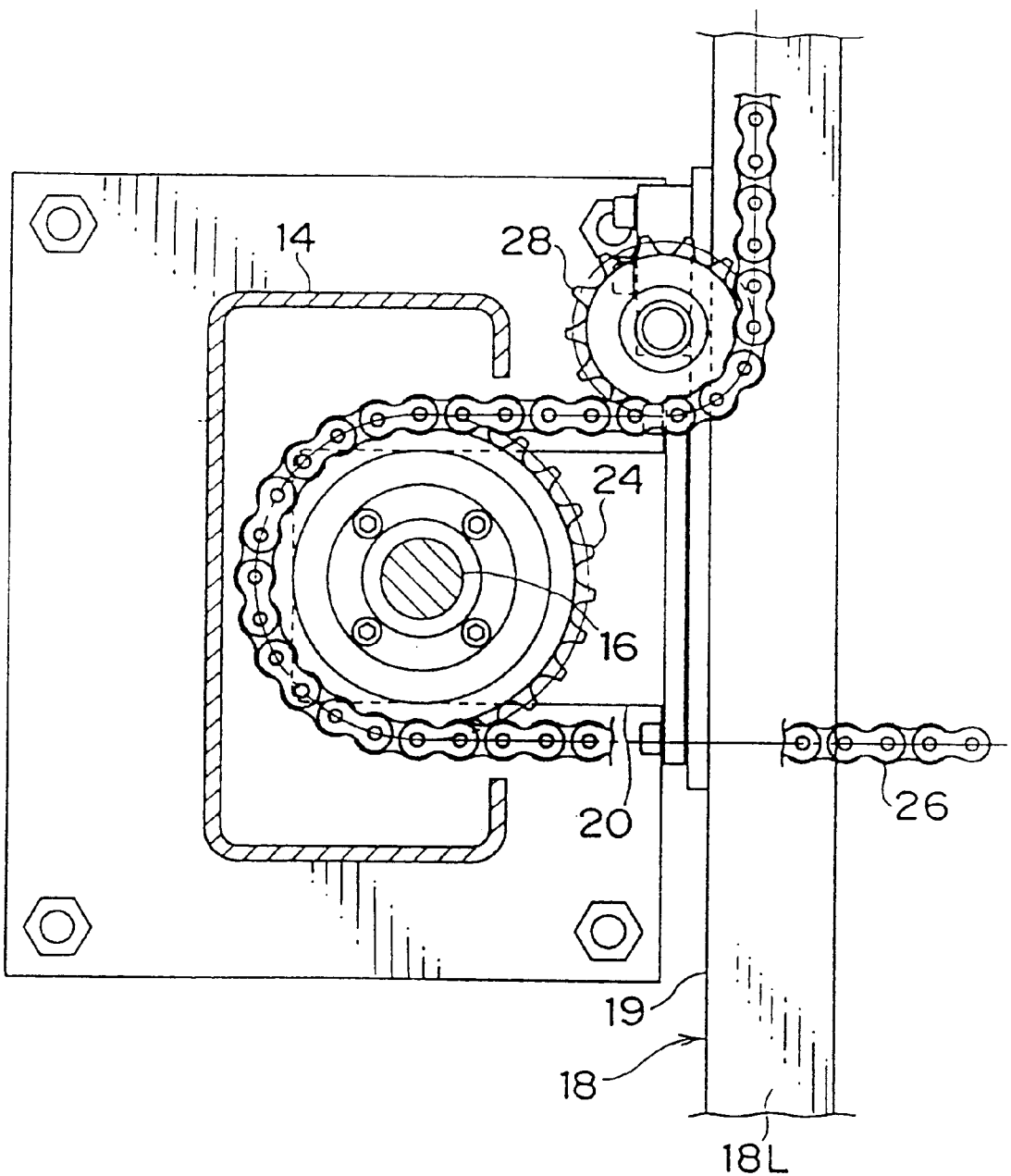
FIG. 4 is a horizontal sectional view of a vicinity of the supporting pillar.

As illustrated in FIGS. 1 and 4, a wheel alignment adjusting device 10 of the present embodiment includes four supporting pillars 14 which stand vertically upright at a floor surface 12.

Figure 2:
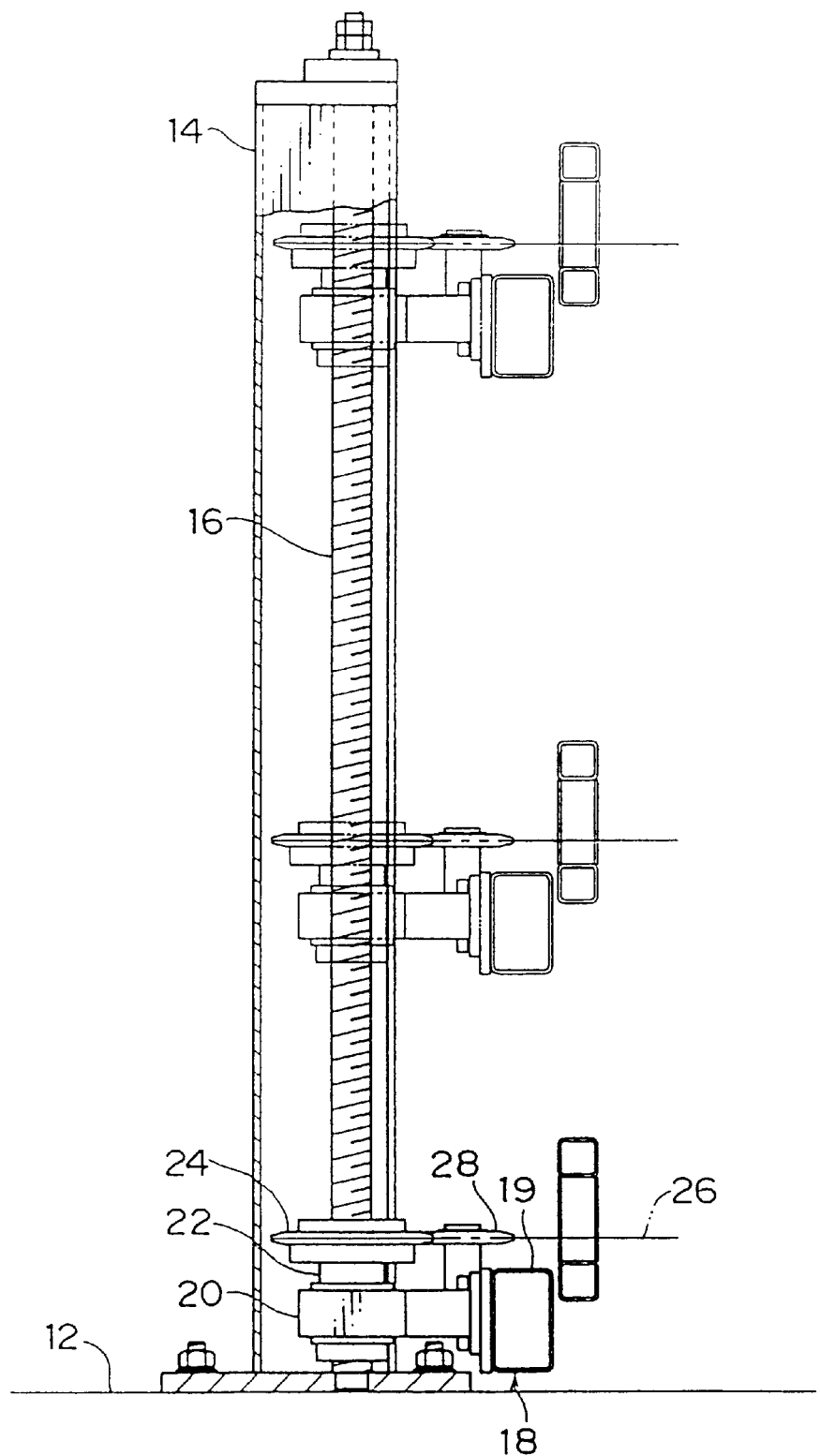
FIG. 2 is a vertical sectional view of a supporting pillar.

As illustrated in FIG. 2, a vertical feed screw 16 is fixed to the supporting pillar 14 in a state of being suspended from an upper portion of the supporting pillar 14.

Figure 3:
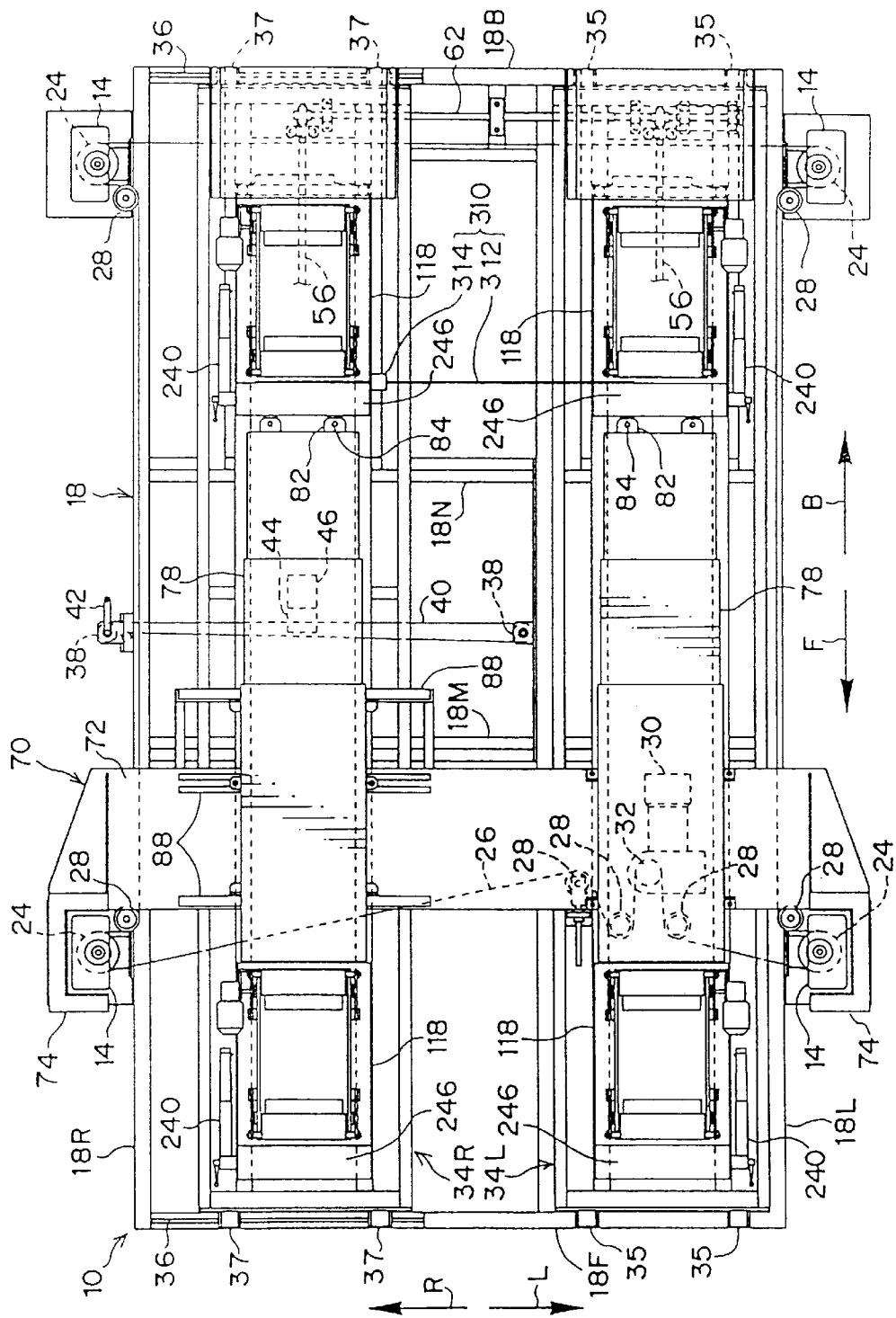
FIG. 3 is a plan view of the wheel alignment adjusting device illustrating a state in which loading stands for the rear wheels are disposed at a furthest rearward position.

As shown in FIG. 3, a loading stand 18 is disposed between the two supporting pillars 14 at the side in the direction of arrow R and the two supporting pillars 14 at the side in the direction of arrow L.

The loading stand 18 includes a substantially rectangular main frame 19 which is formed from frame members 18F, 18B, 18R, 18L, 18M, 18N.

As shown in FIG. 2, a shaft receiving portion 20 is mounted to a position of a side surface of the main frame 19 which position opposes the supporting pillar 14.

A rotating member 22, in which a female screw (not shown in the drawings) is formed, is rotatably supported at the shaft receiving portion 20 via a bearing (not shown in the drawings).

The female screw of the rotating member 22 screws together with the vertical feed screw 16. A sprocket 24 is coaxially fixed to the axial direction upper end portion of the rotating member 22.

As shown in FIGS. 2 through 4, the main frame 19 includes an endless chain 26 which meshes with the sprockets 24. The chain 26 is supported by plural sprockets 28 which are rotatably supported at the main frame 19.

As shown in FIG. 3, a motor unit 30 which drives the chain 26 is mounted to the main frame 19. The chain 26 meshes with a sprocket 32 which is rotated by the motor unit 30.

The chain 26 rotates the sprockets 24 of the respective supporting pillars 14 simultaneously. Thus, when the chain 26 is driven in a predetermined direction, the respective rotating members 22 rotate simultaneously such that the loading stand 18 is raised along the vertical feed screws 16. When the chain 26 is driven in the direction opposite to the predetermined direction, the loading stand 18 is lowered along the vertical feed screws 16.

As illustrated in FIG. 3, a first sub-base 34R and a first sub-base 34L, which extend in the direction of arrow F and in the direction of arrow B, are provided at the upper portion of the main frame 19.

The first sub-base 34L at the arrow L direction side is fixed to the main frame 19 by fixing hardware 35 or the like.

Guide rails 36, which extend along the direction of arrow R and the direction of arrow L, are mounted to the arrow F direction side and the arrow B direction side of the main frame 19.

A linear shaft receiving portion 37, which is engaged so as to be freely slidable along the guide rail 36, is mounted to each of the longitudinal direction end portions of the first sub base 34R. The first sub base 34R is slidable along the direction of arrow R and the direction of arrow L with respect to the main frame 19.

Load receiving rollers (not shown in the drawings), which roll along the top surfaces of the frame members 18M, 18N which extend along the direction of arrow R and the direction of arrow L, are supported so as to be freely rotatable at the bottom surface of the first sub base 34R.

A pair of pulleys 38 is rotatably supported at a longitudinal direction intermediate portion of the main frame 19. An endless wire rope 40 is trained around the pair of pulleys 38.

A handle 42 is mounted to one of the pulleys 38 for rotation of that pulley 38.

A grasping claw 44, which can grasp the wire rope 40, is provided at the first sub-base 34R which is movably supported.

The grasping claw 44 is connected to a solenoid 46 provided at the first sub-base 34R. When the solenoid 46 is in an energized state, the grasping claw 44 grasps the wire rope 40, whereas when the solenoid 46 is in a non-energized state, the grasping claw 44 releases the wire rope 40.

Accordingly, by turning the handle 42 in the state in which the grasping claw 44 is grasping the wire rope 40, the movably supported first sub-base 34R can be moved in the direction of arrow R and the direction of arrow L.

Figure 5:
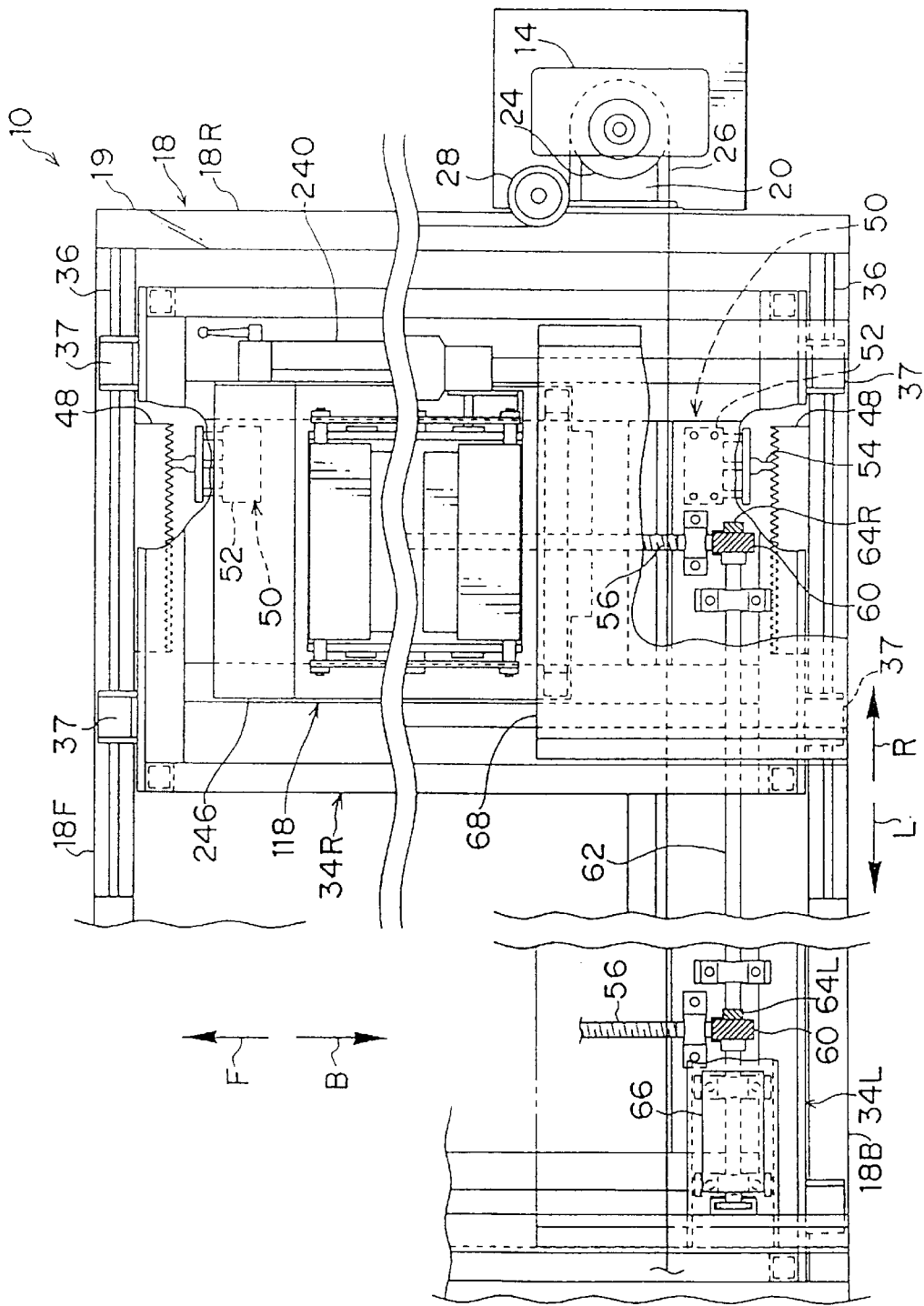
FIG. 5 is an enlarged plan view of vicinities of front and rear ends of the wheel alignment adjusting device.

As illustrated in FIG. 5, at the main frame 19, a rack 48 is fixed to each of the arrow F direction side frame member 18F and the arrow B direction side frame member 18B.

A lock device 50 is disposed at each of the arrow F direction side end portion and the arrow B direction side end portion of the movably supported first sub-base 34R.

The lock device 50 is provided with an wedge-shaped tooth 54 which is driven by a solenoid 52 to move in directions of approaching and moving apart from the rack 48 of the main frame 19. Due to the tooth 54 entering into the space ("valley") between two teeth of the rack 48, the movably supported first sub-base 34R is accurately positioned and fixed, parallel to the first sub-base 34L which is fixed to the main frame 19.

Usually, the solenoid 52 of the lock device 50 is in a nonenergized state, and at this time, the tooth 54 is entered into a valley of the rack 48 as illustrated in FIG. 5 (locked state). On the other hand, when the solenoid 52 is energized, the tooth 54 separates from the rack 48 (unlocked state).

As illustrated in FIG. 3, a tire driving device 118 is provided in a vicinity of the arrow F direction side end portion and in a vicinity of the arrow B direction side end portion of the first sub-base 34R and the first sub-base 34L, respectively. The internal structure of the tire driving device 118 will be described later.

The tire driving device 118 at the arrow B direction side of the first sub-base 34R is supported by a mechanism, which will be described layer, so as to be slidable in the direction of arrow F and in the direction of arrow B with respect to the first sub-base 34R. The tire driving device 118 at the arrow F direction side of the first subbase 34R is fixed and does not slide in the direction of arrow F and the direction of arrow B with respect to the first sub-base 34R.

Similarly, the tire driving device 118 at the arrow B direction side of the first sub-base 34L is supported, by a mechanism which will be described later, so as to be slidable in the direction of arrow F and in the direction of arrow B with respect to the first sub-base 34L. The tire driving device 118 at the arrow F direction side of the first sub-base 34L is fixed and does not slide in the direction of arrow F and the direction of arrow B with respect to the first sub-base 34L.

A feed screw 56, which extends along the moving direction of the slidably supported tire driving device 118, is rotatably supported at the first sub-base 34R which is supported so as to be movable.

Figure 12:
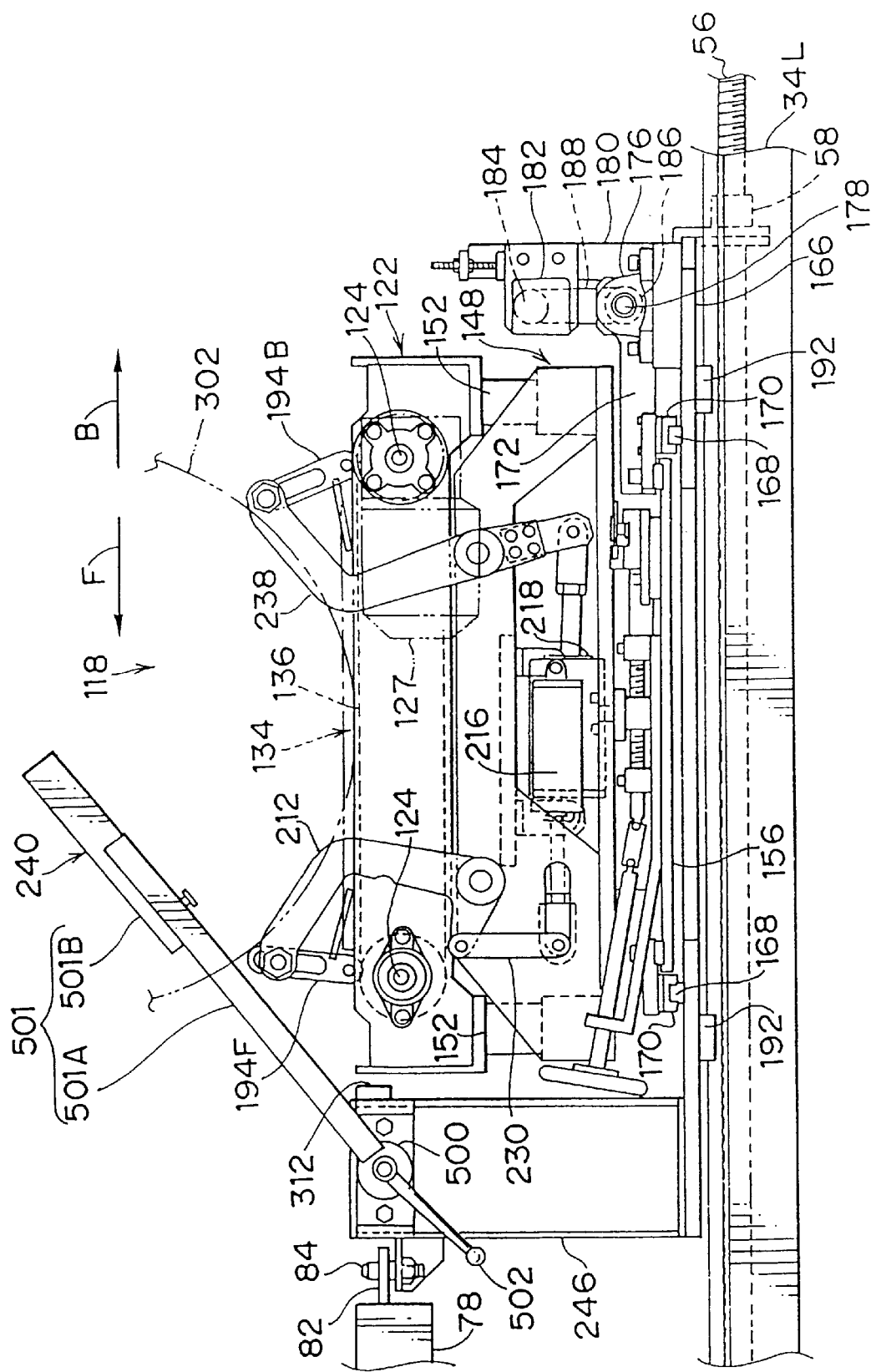
FIG. 12 is a side view, as seen from the left side, of the tire driving device in a state in which a wheel stopping plate is inclined.

As illustrated in FIG. 12, a nut 58 having a female screw (not shown in the drawings) which screws together with the feed screw 56, is fixed to the slidably supported tire driving device 118. By rotating the feed screw 56, the tire driving device 118 having the nut 58 can be moved in the direction of arrow F and in the direction of arrow B.

As shown in FIG. 5, a gear 60 is fixed to the arrow B direction side end portion of the feed screw 56.

Because the first sub-base 34L has the same structure as that of the first sub-base 34R, except for the fact that the first sub-base 34L is fixed to the main frame 19, description of the first sub-base 34L will be omitted.

As shown in FIG. 5, a shaft 62 which extends along the arrow R direction and the arrow L direction is rotatably supported at the arrow B direction side of the main frame 19.

The shaft 62 is formed from two shafts of different diameters. A spline shaft portion is provided at the outer surface of the narrow-diameter shaft. A spline hole portion, with which the spline shaft portion engages, is formed in the large-diameter shaft. Thus, the two shafts are engaged such that torque can be transmitted from one shaft to the other, and relative movement in the axial direction thereof of one shaft to the other is possible.

A gear 64R, which meshes with the gear 60 of the feed screw 56 provided at the first sub-base 34R, is fixed to the arrow R direction end portion of the shaft 62. A gear 64L, which meshes with the gear 60 of the feed screw 56 provided at the first sub-base 34L, is fixed to the arrow L direction end portion of the shaft 62. By rotating the shaft 62, the two feed screws 56 are rotated simultaneously, and the slidably supported two tire driving devices 118 can be moved simultaneously and by the same amount and in the same direction.

Rotating driving force from a motor unit 66 provided at the main frame 19 is transferred to the shaft 62 via a chain (not shown in the drawings).

Figure 6:
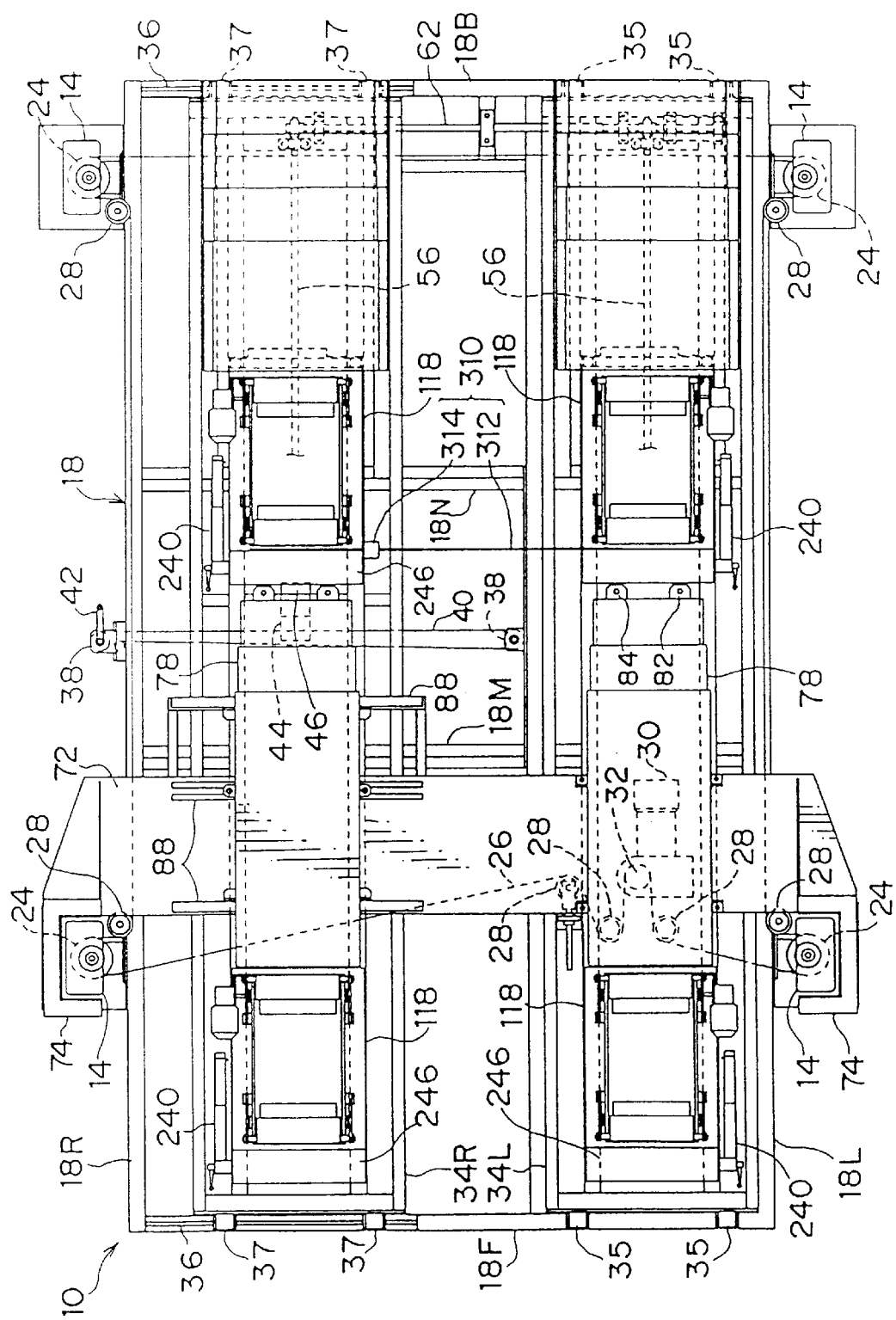
FIG. 6 is a plan view of the wheel alignment adjusting device, and illustrates a state in which the loading stands for the rear wheels are moved slightly forward.
Figure 7:
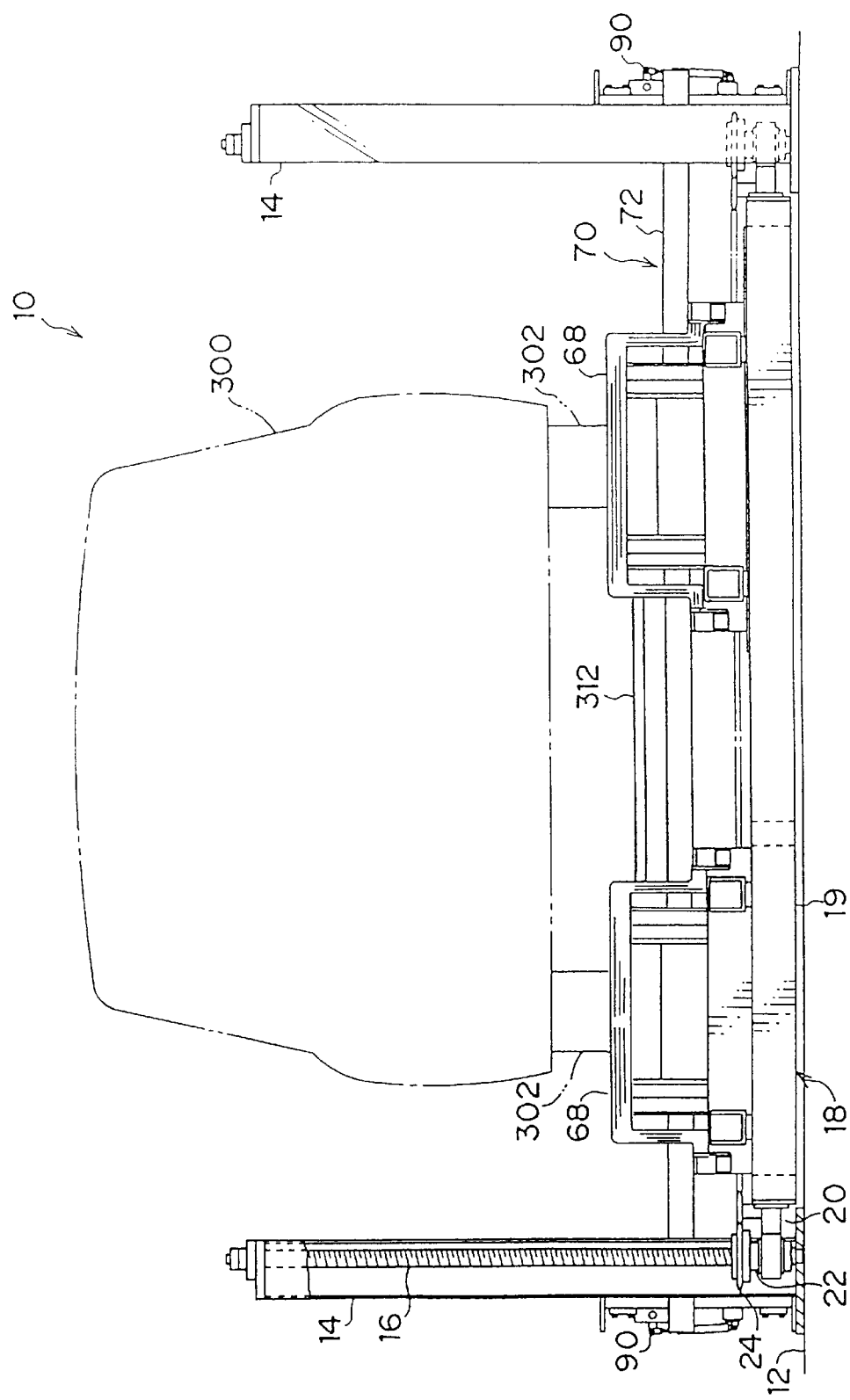
FIG. 7 is a side view of the wheel alignment adjusting device as seen from the rear.

As illustrated in FIGS. 6 and 7, at each of left and right sides, one end of a first transfer plate 68 is fixed to the arrow B direction side tire driving device 118. The first transfer plate 68 is formed from a plurality of substantially U-shaped (in cross section) plate members and is expandable and contractible along the direction of arrow F and the direction of arrow B. The other end of the first transfer plate 68 is fixed to the arrow B direction side frame member 18B of the main frame 19.

Figure 8:
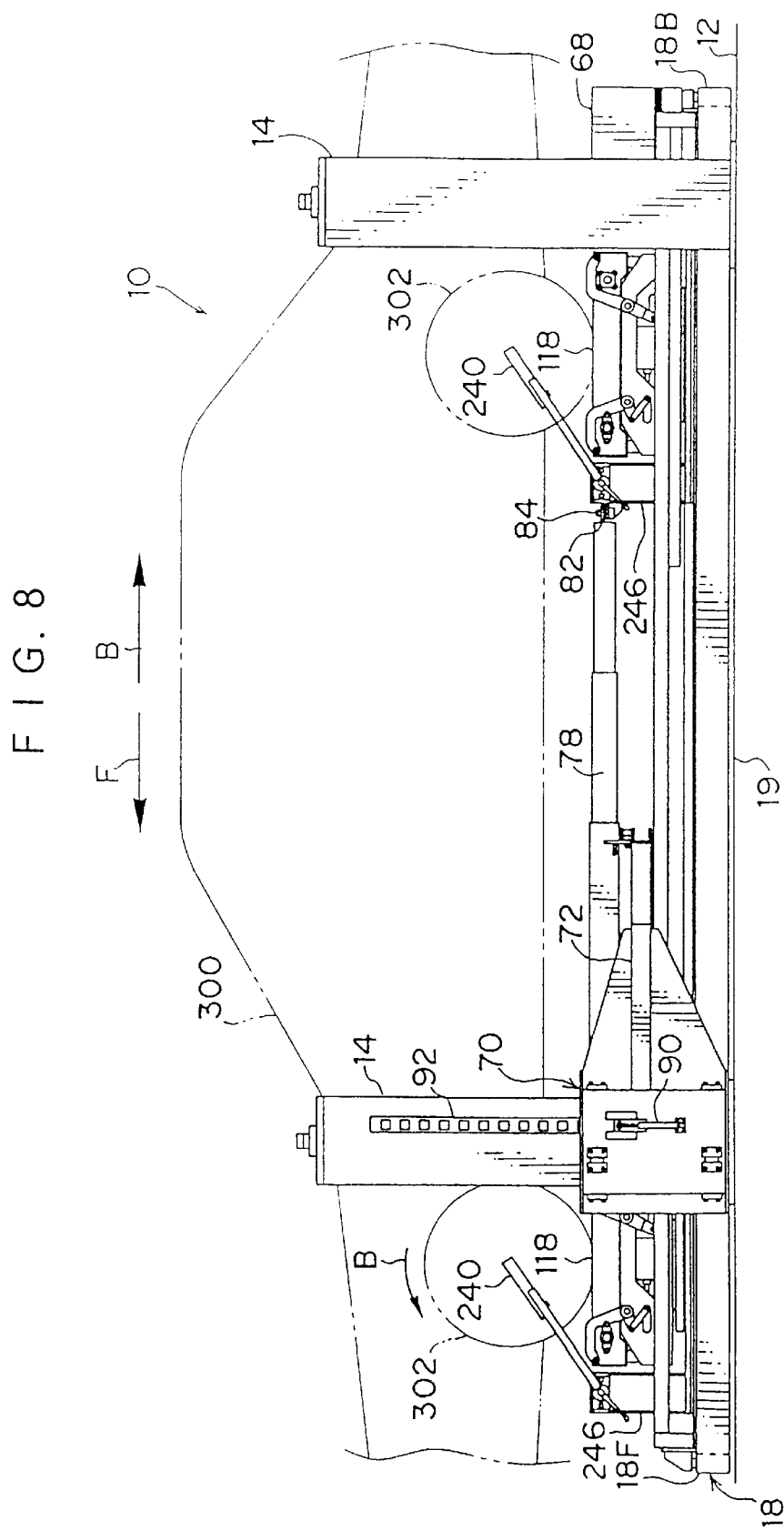
FIG. 8 is a side view, as seen from the left side of the wheel alignment adjusting device, illustrating a state in which the loading stand and a second sub-base have been lowered to a lowermost position.

The upper surface of the tire driving device 118 and the upper surface of the first transfer plate 68 are set at substantially the same height as illustrated in FIG. 8.

Accordingly, even if the slidably supported tire driving device 118 moves in the direction of arrow F, the first transfer plate 68 extends. Therefore, regardless of the position of the tire driving device 118, a vehicle 300 (wheel 302) can be moved from the arrow B direction side of the loading stand 18 onto the tire driving device 118. Second Sub-Base As illustrated in FIGS. 6 and 8, a second sub-base 70 is provided on the loading stand 18.

As illustrated in FIG. 6, the second sub-base 70 is provided with a horizontal member 72 which extends horizontally so as to span between the two arrow F direction side supporting pillars 14.

A supporting portion 74, which is formed so as to enclose three side surfaces of the supporting pillar 14, is provided at each of the arrow R direction end portion and the arrow L direction end portion of the horizontal member 72.

Figure 9:
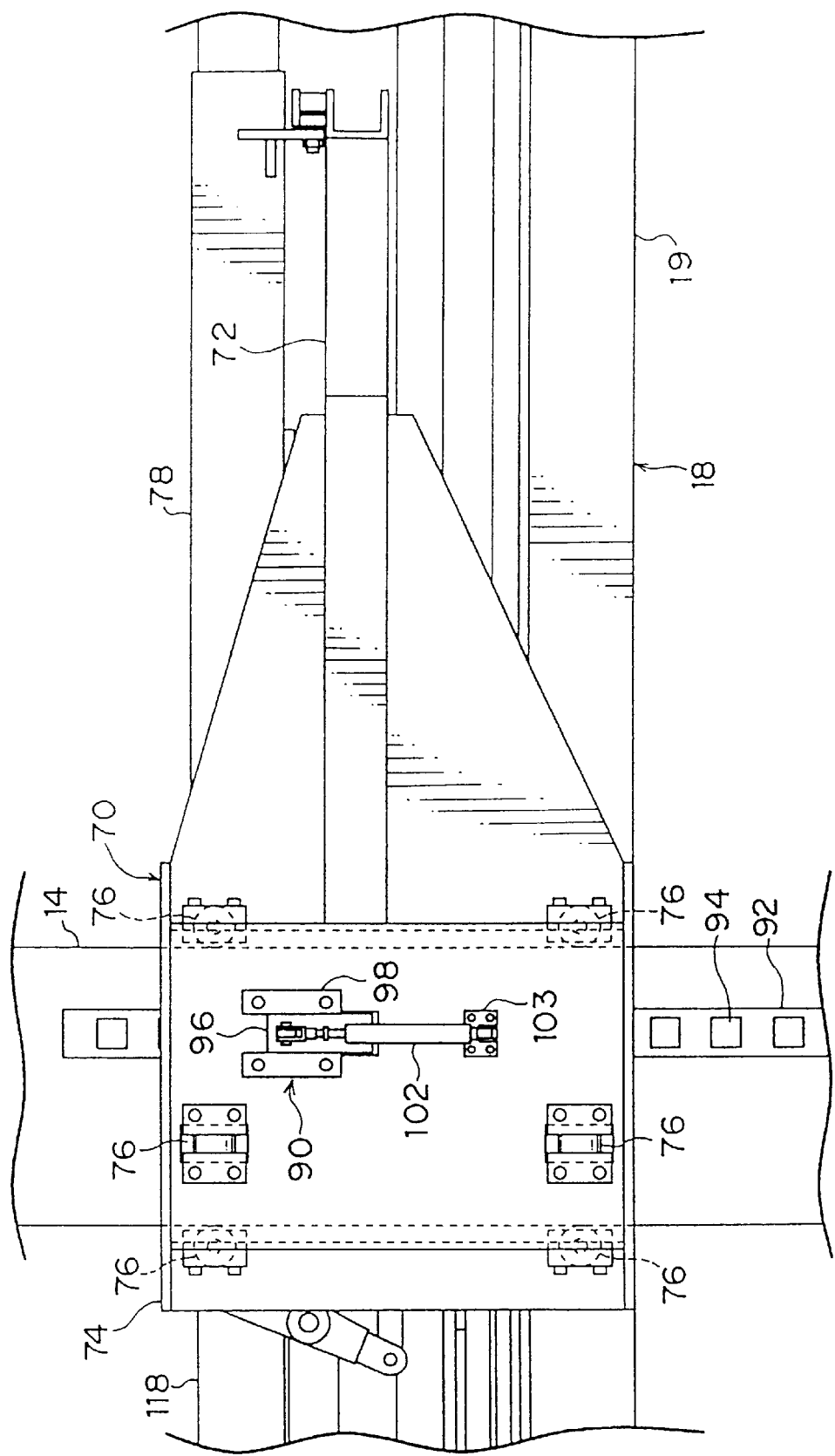
FIG. 9 is a side view, as seen from the left side, of a vicinity of a supporting portion of the second sub-base.

As illustrated in FIG. 9, a plurality of guide rollers 76 are rotatably supported at the supporting portion 74 so as to abut three side surfaces of the supporting pillar 14. The second sub-base 70 can be moved vertically while being guided by the supporting pillars 14.

As illustrated in FIG. 6, a second transfer plate 78 is provided at each of the arrow R direction side and the arrow L direction side at the top portion of the second sub-base 70.

The second transfer plate 78 is formed from a plurality of plates, and is extendable in the direction of arrow B from the second subbase 70.

The top surface of the second transfer plate 78 and the top surface of the arrow F direction side tire driving device 118 are set to be substantially the same height as illustrated in FIG. 8.

As illustrated in FIG. 12 and in FIG. 8, plate members 82 are provided at the arrow B direction side end portion of the second transfer plate 78. A hole which extends vertically is formed in each plate member 82.

Pins 84, each of whose axial direction is the vertical direction, are provided in a vicinity of the upper end of the arrow F direction side of a supporting stand 246 (which will be described later) which is provided at the arrow B direction side tire driving device 118 which is supported so as to be movable.

The pin 84 can be inserted into the hole of the plate member 82 from below. When the movable tire driving device 118 is moved in the direction of arrow B in a state in which the pin 84 is inserted into the hole of the plate member 82, the second transfer plate 78 extends (see FIGS. 3 and 8 in a state in which it spans between the second sub-base 70 and the movably supported tire driving device 118. When the movable tire driving device 118 moves in the direction of arrow F, the second transfer plate 78 becomes shorter (see FIG. 6).

The second transfer plate 78 at the arrow L direction side is fixed with respect to the horizontal member 72 such that this second transfer plate 78 does not move in the direction of arrow R and in the direction of arrow L.

Referring now to FIG. 3, a plurality of guide rollers (not illustrated) are rotatably supported at the arrow R direction side second transfer plate 78. These guide rollers engage with a plurality of guide rails 88 which are provided at the horizontal member 72 and extend in the direction of arrow R and the direction of arrow F. As a result, the second transfer plate 78 at the arrow R direction side can slide in the direction of arrow R and the direction of arrow L with respect to the horizontal member 72. When the first sub-base 34R is moved in the direction of arrow R or in the direction of arrow L with the pin 84 inserted into the hole of the plate member 82 (see FIG. 8), the second transfer plate 78 also is moved in the direction of arrow R or in the direction of arrow L, such that the two tire driving devices 118 on the first sub-base 34R and the second transfer plate 78 at the; arrow R direction side are always maintained in a relation of being disposed on a straight line.

Figure 10:
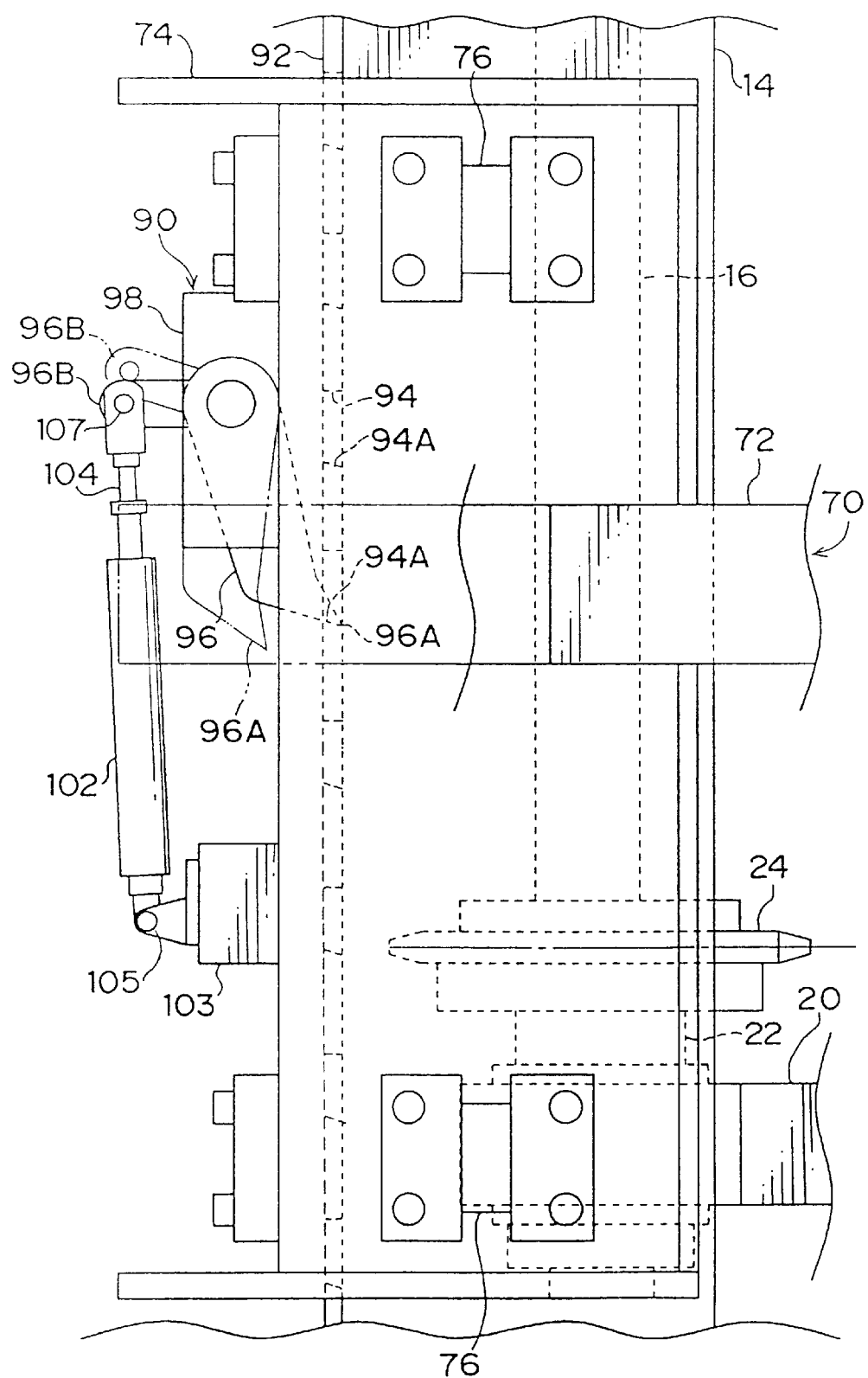
FIG. 10 is a side view, as seen from the rear, of the vicinity of the supporting portion of the second sub-base.

As illustrated in FIG. 9 and FIG. 10, the second sub-base 70 includes a lock device 90 at each supporting portion 74. A lock plate 92 is provided at each supporting pillar 14 corresponding to respective supporting portions 74.

The lock plate 92 is formed so as to be long in the vertical direction, and a plurality of square holes 94 are formed in the lock plate 92 in the vertical direction at uniform intervals.

The lock device 90 includes a lock lever 96 which engages with the square holes 94.

The intermediate portion of the lock lever 96 is supported and is swingable at a shaft receiving portion 98 fixed to the supporting portion 74. A vicinity of a lower end 96A of the lock lever 96 can be inserted into the square holes 94.

A lower end 94A of the square hole 94 is formed so as to be inclined slightly downward toward the inner side thereof (the supporting pillar 14 side thereof) from the outer side thereof. The lower surface in the vicinity of the lower end 96A of the lock lever 96 is formed so as to contact in parallel the lower end 94A of the square hole 94 in a state in which the lower end 96A of the lock lever 96 is inserted into the square hole 94. When load is applied to the lock lever 96, the lock lever 96 receives the force in the direction in which the lower end 96A thereof enters into the square hole 94.

The lock device 90 includes a double-acting air cylinder 102 (i.e., an air cylinder of the type having, at both sides of the piston, an air chamber into which air is made to enter and from which air is made to leave).

The main body of the air cylinder 102 is supported via a pin 105 at a supporting member 103 of the supporting portion 74, such that the air cylinder 102 is swingable.

A distal end of a piston rod 104 of the air cylinder 102 is connected via a pin 107 to an upper end 96B of the lock lever 96.

A solenoid valve, a pressure regulating valve, an air compressor and the like (all not shown in the drawings) are connected to the air cylinder 102. The operation of the solenoid valve and the air compressor is controlled by a control device 126 which is shown in FIG. 15.

The control device 126 can be formed by, for example, a microcomputer. A display device 126A, which is a CRT or the like for displaying the values measured by a force sensor 152 which will be described later and for displaying the adjustment direction of the positional angle of the wheel 302 and the like, is connected to the control device 126.

Usually, the air cylinder 102 urges the lock lever 96, by air pressure, in a direction in which the bottom end 96A of the lock lever 96 approaches the lock plate 92.

Accordingly, when the loading stand 18 is raised such that the second sub-base 70 rises, the lower end 96A of the lock lever 96 engages successively with the plurality of square holes 94 while sliding along the lock plate 92 or the side surface of the supporting pillar 14. When the loading stand 18 is lowered, the lower end 96A of the lock lever 96 is inserted into the square hole 94 and the lower end 96A catches on the lower end 94A (the state illustrated by the dotted line in FIG. 10) such that the lowering of the second sub-base 70 is stopped and only the loading stand 18 is lowered.

When the second sub-base 70 is lowered together with the loading stand 18, first, the second sub-base 70 is supported and lifted slightly from below by the loading stand 18. The lower end 96A of the lock lever 96 moves upward so as to separate from the lower end 94A of the square hole 94 of the lock plate 92, and the lock lever 96 becomes slidable. In this state, the air cylinder 102 is operated and the lock lever 96 rotates so that the lower end 96A comes out from the square hole 94.

Next, when the lower end 96A of the lock lever 96 is maintained in the state of being out of the square hole 94 and the loading stand 18 is lowered, the second sub-base 70 can be lowered together with the loading stand 18 while in a state of being loaded on the loading stand 18.

Tire Driving Device

Figure 11:
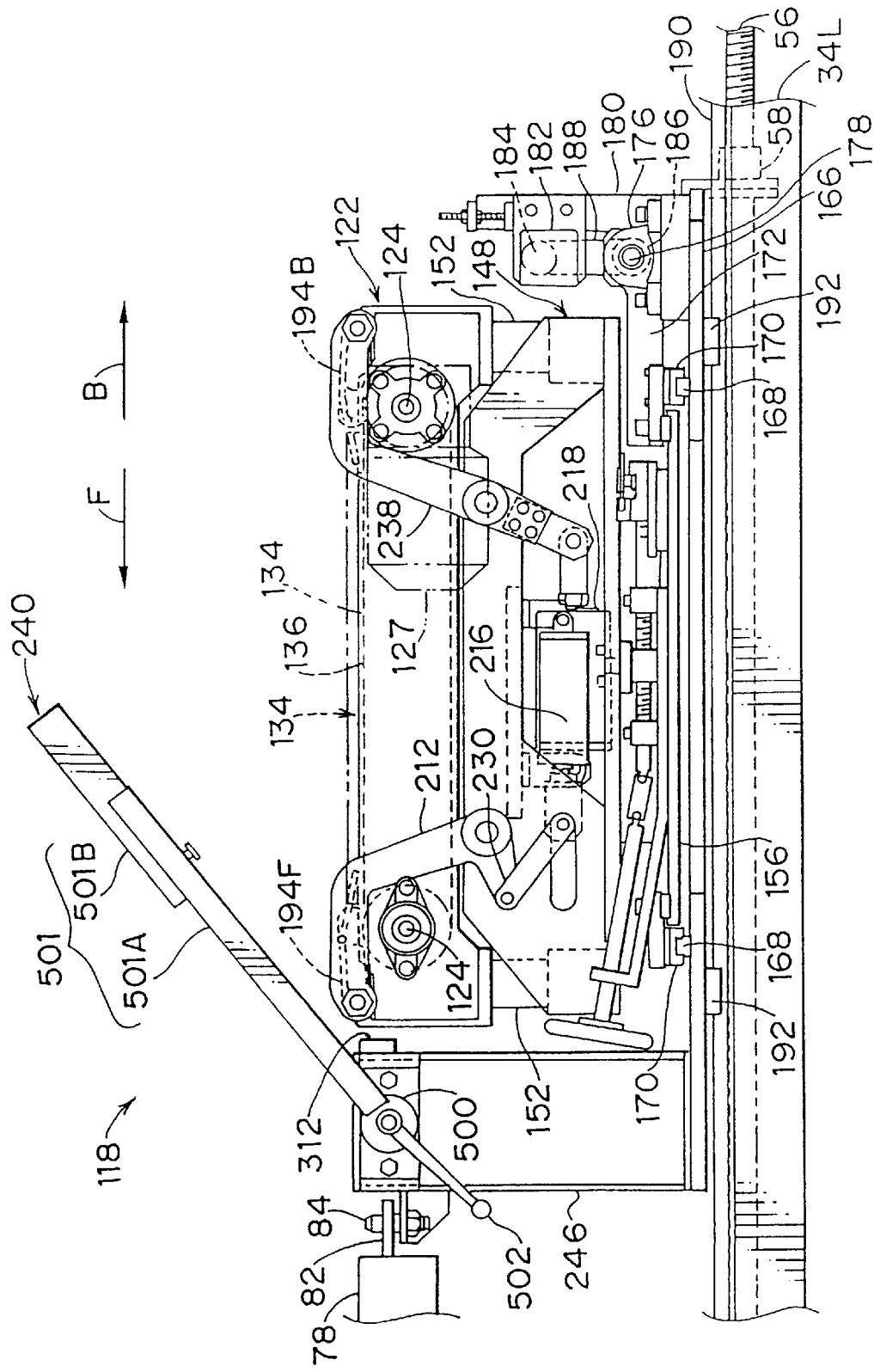
FIG. 11 is a side view, as seen from the left side, of the tire driving device in a state in which a wheel stopping plate is inclined.

As illustrated in FIG. 11, the tire driving device 118 includes a frame 122.

A pair of drive shafts 124, to which sprockets (not shown in the drawings) are mounted, are rotatably supported at the frame 122.

Figure 22:
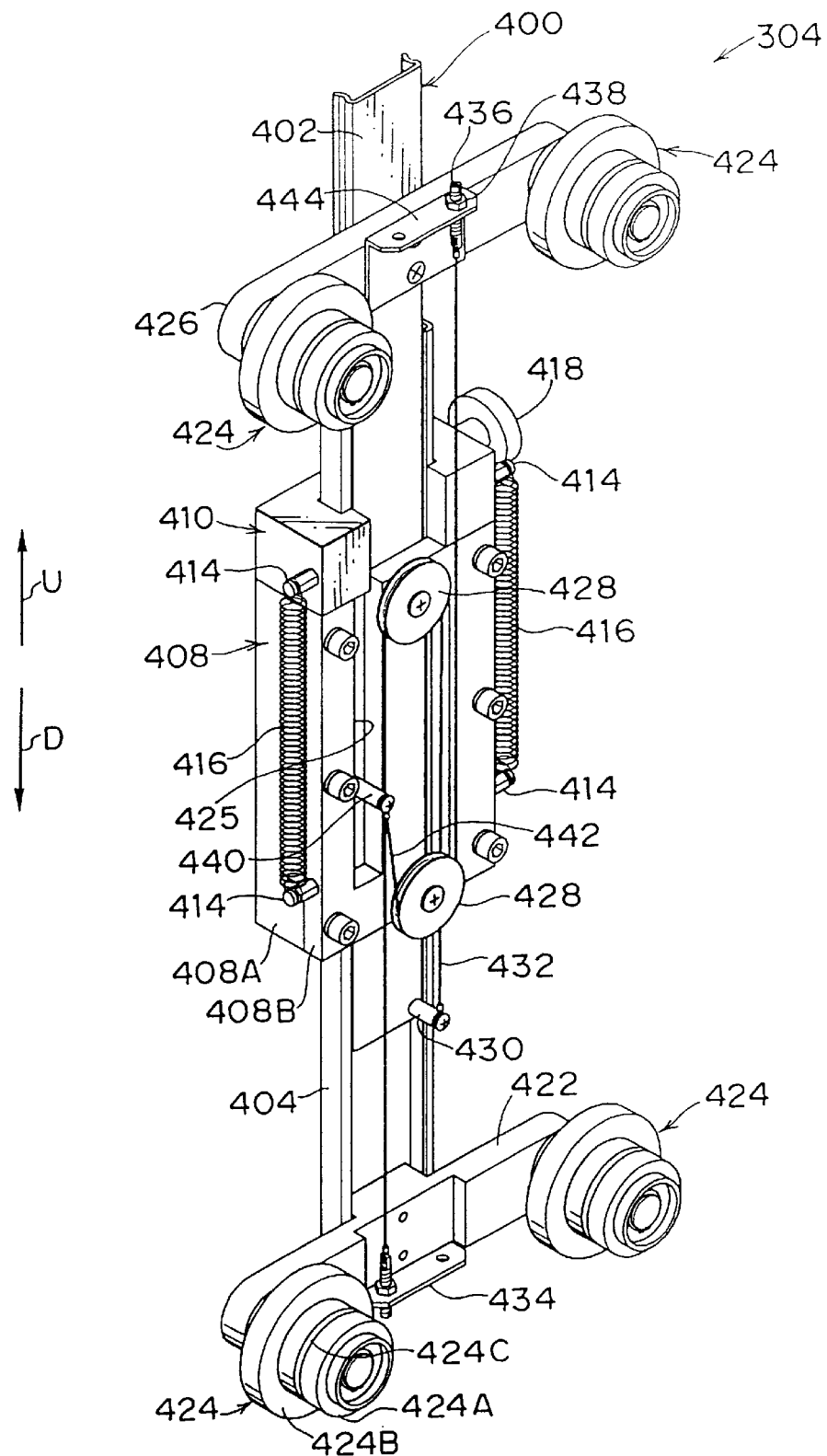
FIG. 22 is a perspective view as seen from a reverse surface side of the jig.

One of the drive shafts 124 is connected to a motor 127 whose driving is controlled by the control device 126 (see FIG. 22).

An endless chain (not shown in the drawings) is trained around the sprocket of one drive shaft 124 and the sprocket of the other drive shaft 124.

Long, thin plates 132 are connected to the chain continuously along the longitudinal direction of the chain, so as to form an endless track 134. The long, thin plate 132 has a length which is sufficiently longer than the width of the tire, and has a width which is of an extent that does not permit the long, thin plate 132 to enter into the grooves of the tread pattern of the tire. A plurality of protrusions 138 are formed along the circulating direction, on the outer peripheral surface of the endless track 134, so as to form one protruding portion. As seen from above the tire driving device 118, the surface formed by the upper surfaces of the plurality of plates 132 is called the tire driving surface 136.

As illustrated in FIG. 11, a supporting frame 148 is disposed beneath the frame 122. The frame 122 is disposed on the supporting frame 148 via force sensors 152. The force sensor 152 can detect the magnitude and the direction of the force applied to the frame 122 via the endless track 134, and outputs the results of measurement to the control device 126.

As shown in FIG. 11, the supporting frame 148 is mounted to the top surface of vehicle transverse direction moving base plate 156.

A longitudinal direction moving base plate 166 is disposed horizontally beneath the vehicle transverse direction moving base plate 156.

A pair of guide rails 168 for left and right sliding, which extend along the left and right directions of the vehicle (the direction orthogonal to the surface of the drawing of FIG. 11) are mounted to the top surface of the longitudinal direction moving base plate 166.

A linear shaft receiving portion 170 is slidably supported at each of the guide rails 168 for left and right sliding. The vehicle transverse direction moving base plate 156 is mounted to the linear shaft receiving portions 170.

Accordingly, the vehicle transverse direction moving base plate 156 is supported so as to be movable along the left and right directions of the vehicle along the guide rails 168 for left and right sliding, with respect to the longitudinal direction moving base plate 166.

A bracket 172 is mounted to the transverse direction moving base plate 156 so as to protrude in the direction of arrow B. A nut (not illustrated), in which a female screw is formed and whose axial direction is along the vehicle left and right directions, is mounted to the distal end portion of the bracket 172.

A feed screw 178, which is rotatably supported by a shaft receiving portion 176, is provided at the longitudinal direction moving base plate 166. A nut is screwed together with the feed screw 178.

A motor 182, which is mounted to a bracket 180, is provided at the longitudinal direction moving base plate 166.

A pulley 184 is mounted to the rotating shaft of the motor 182. A pulley 186 is mounted to the one end of the feed screw 178 which opposes the pulley 184.

An endless timing belt 188 is trained about the pulley 184 and the pulley 186.

The motor 182 is connected to the control device 126 (see FIG. 15). The driving of the motor 182 is controlled by the control device 126.

In this way, when the motor 182 is driven and the feed screw 178 is rotated, the vehicle transverse direction moving base plate 156, the frame 122, the supporting frame 148 and the like integrally move in the left and right directions of the vehicle with respect to the longitudinal direction moving base plate 166.

Figure 13:
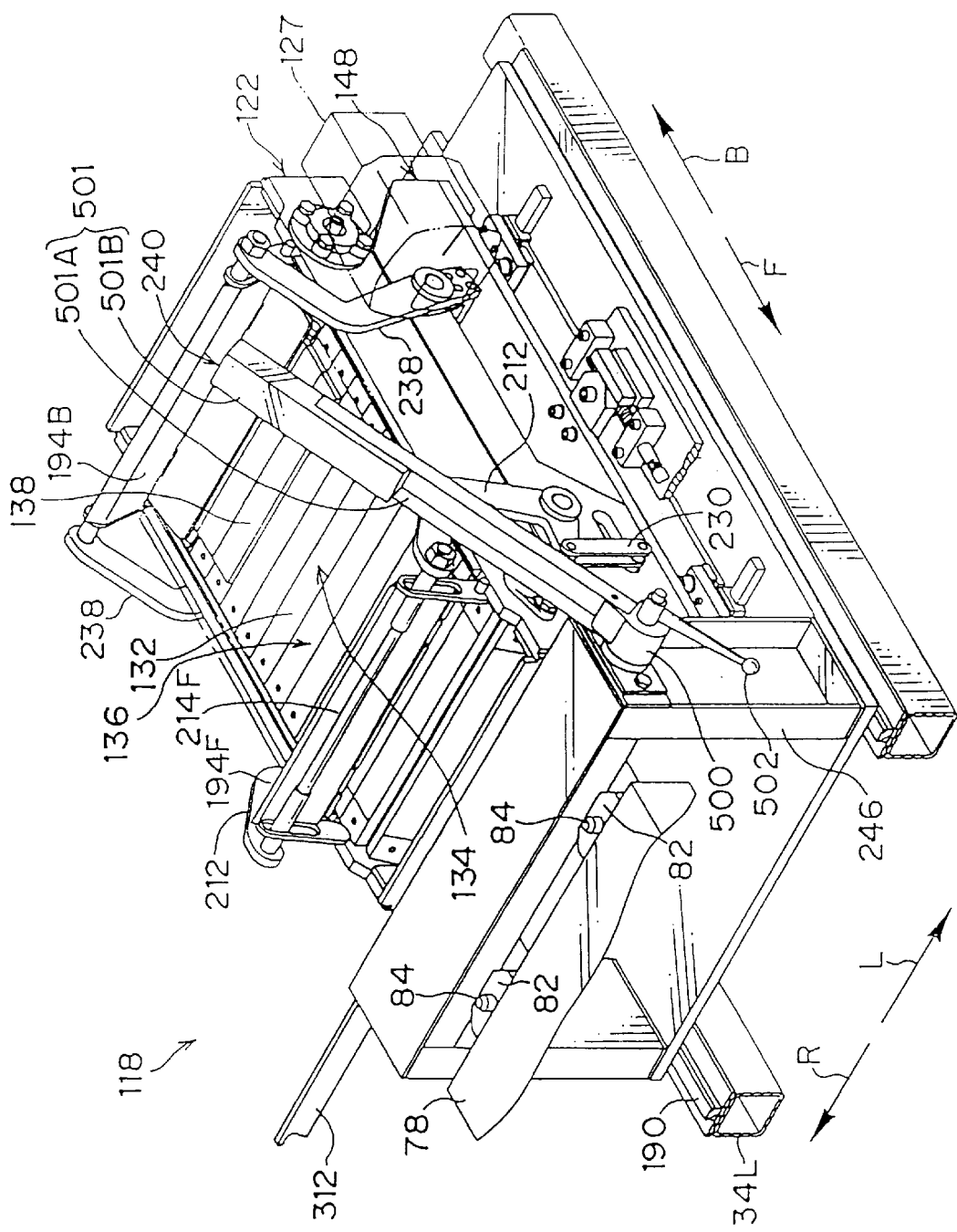
FIG. 13 is a perspective view of the tire driving device, and illustrates a state in which the wheel stopping plate is inclined.

As illustrated in FIG. 11 and FIG. 13, a pair of guide rails 190 for longitudinal sliding, which extend parallel to one another along the direction of arrow F and the direction of arrow B, are mounted to the top surfaces of the first sub-base 34L and the first sub-base 34R (not illustrated in FIGS. 11 and 13).

A plurality of linear shaft receiving portions 192, which fit together with the guide rails 190 for longitudinal sliding, are mounted to the bottom surface of the longitudinal direction moving base plate 166, such that the tire driving device 118 is supported so as to be movable in the longitudinal direction of the vehicle.

The nut 58 which screws together with the feed screw 56 is mounted to the longitudinal direction moving base plate 166 of the movably supported tire driving device 118. As a result, by rotating the feed screw 56 as described previously, the movably supported tire driving device 118 can be moved in the longitudinal direction.

As shown in FIGS. 12, 13, 14, a wheel stopping plate 194F is provided swingably at the frame 122 at the arrow F direction side of the tire driving device 118, and a wheel stopping plate 194B is provided swingably at the frame 122 at the arrow B direction side of the tire driving device 118. The wheel stopping plates 194F and 194B are provided so as to straddle across the tire driving device 118 as shown in FIG. 13.

Driving force of a first cylinder 216 provided on the supporting frame 148 is transferred to the wheel stopping plate 194F via a short link 230 and a link 212 such that the wheel stopping plate 194F swings.

On the other hand, driving force of a second cylinder 218 provided on the supporting frame 148 is transferred via a link 238 to the wheel stopping plate 194B such that the wheel stopping plate 194B swings.

In the present embodiment, when the vehicle 300 is to be moved, as illustrated in FIG. 11, the wheel stopping plate 194F and the wheel stopping plate 194B are disposed horizontally. Namely, the wheel stopping plate 194F and the wheel stopping plate 194B are disposed so as to not prevent the wheel from moving on the tire driving device 118. When the wheels 302 are to be fixed, the wheel stopping plate 194F and the wheel stopping plate 194B are raised and set at an incline as illustrated in FIGS. 12 and 13.

The driving of the first cylinder 216 and the second cylinder 218 is controlled by the control device 126 (see FIG. 15).

As illustrated in FIG. 3, a left and right connecting device 310 is provided at the two tire driving devices 118 at the arrow B direction side. The left and right connecting device 310 is formed from a flat steel member 312 and a nipping device 314. One end of the flat steel member 312 is fixed to the arrow L direction side tire driving device 118, and the flat steel member 312 extends toward the arrow R direction side. The nipping device 314 is provided at the arrow R direction side tire driving device 118, and fixably nips the flat steel member 312 therewith.

(Ji)

Hereinafter the structure of a jig 304 will be described.

Figure 21:
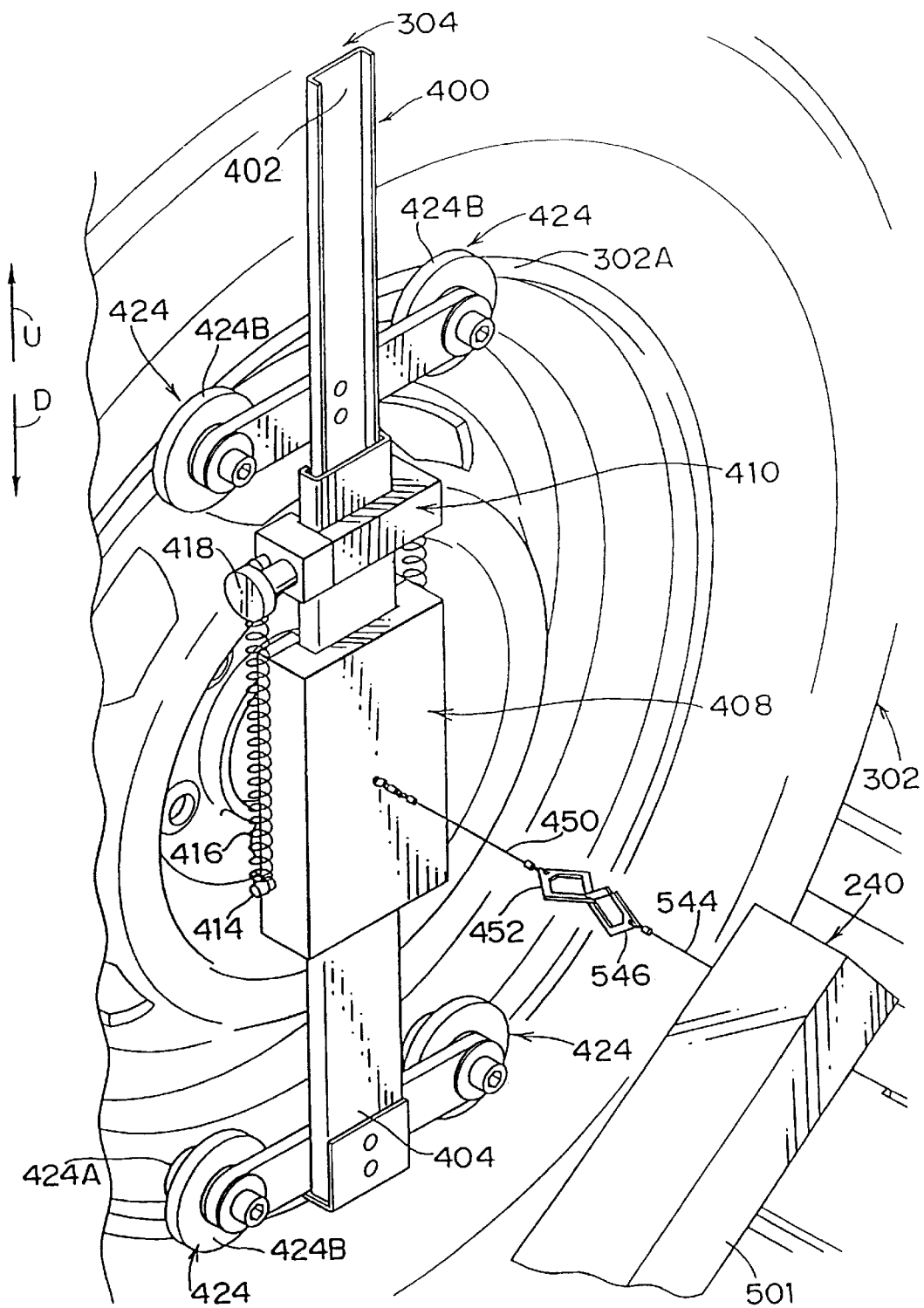
FIG. 21 is a perspective view of a jig mounted to a wheel.

As illustrated in FIGS. 21 and 22, the jig 304 has a linear slide bearing 400.

Figure 23:
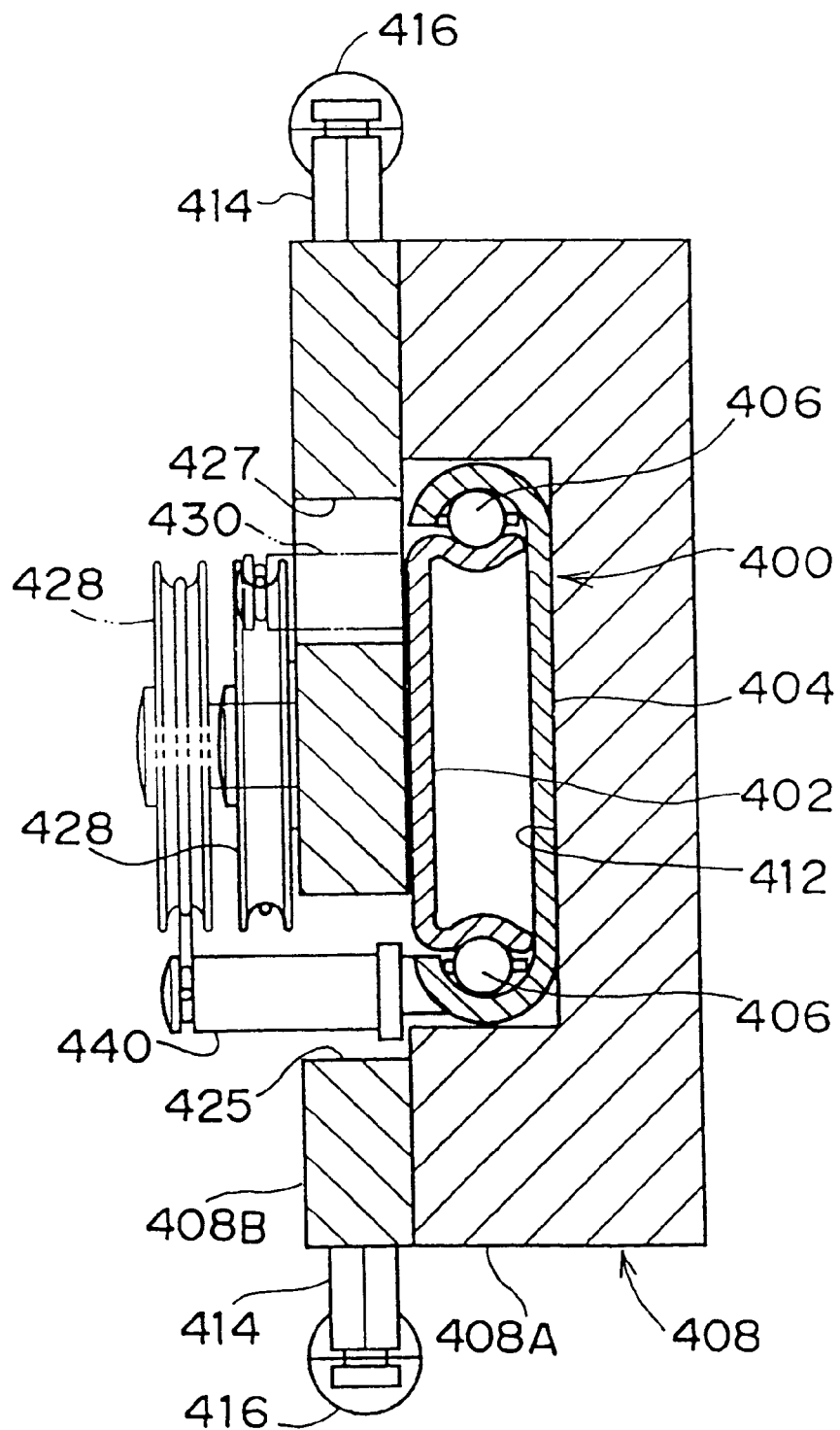
FIG. 23 is a cross-sectional view of a center block portion of the jig.

As illustrated in FIG. 23, the linear slide bearing 400 has an inner member 402, an outer member 404 and a plurality of steel balls 406. The inner member 402 and the outer member 404 are combined so as to be relatively movable along the longitudinal direction.

As illustrated in FIG. 21 and FIG. 22, a center block 408 and a stopper block 410 are mounted to the outer member 404.

As shown in FIG. 22 and FIG. 23, the center block 408 includes a substantially rectangular parallelepiped main body portion 408A and a plate 408B.

A grove 412 is formed in the transverse direction central portion of the main body portion 408A. The plate 408B is fixed to the main body portion 408A so as to cover the groove 412.

The linear slide bearing 400 is slidably inserted into a hole portion which has a rectangular cross-section and which is formed by the plate 408B covering the groove 412 of the main body portion 408A.

Figure 24:
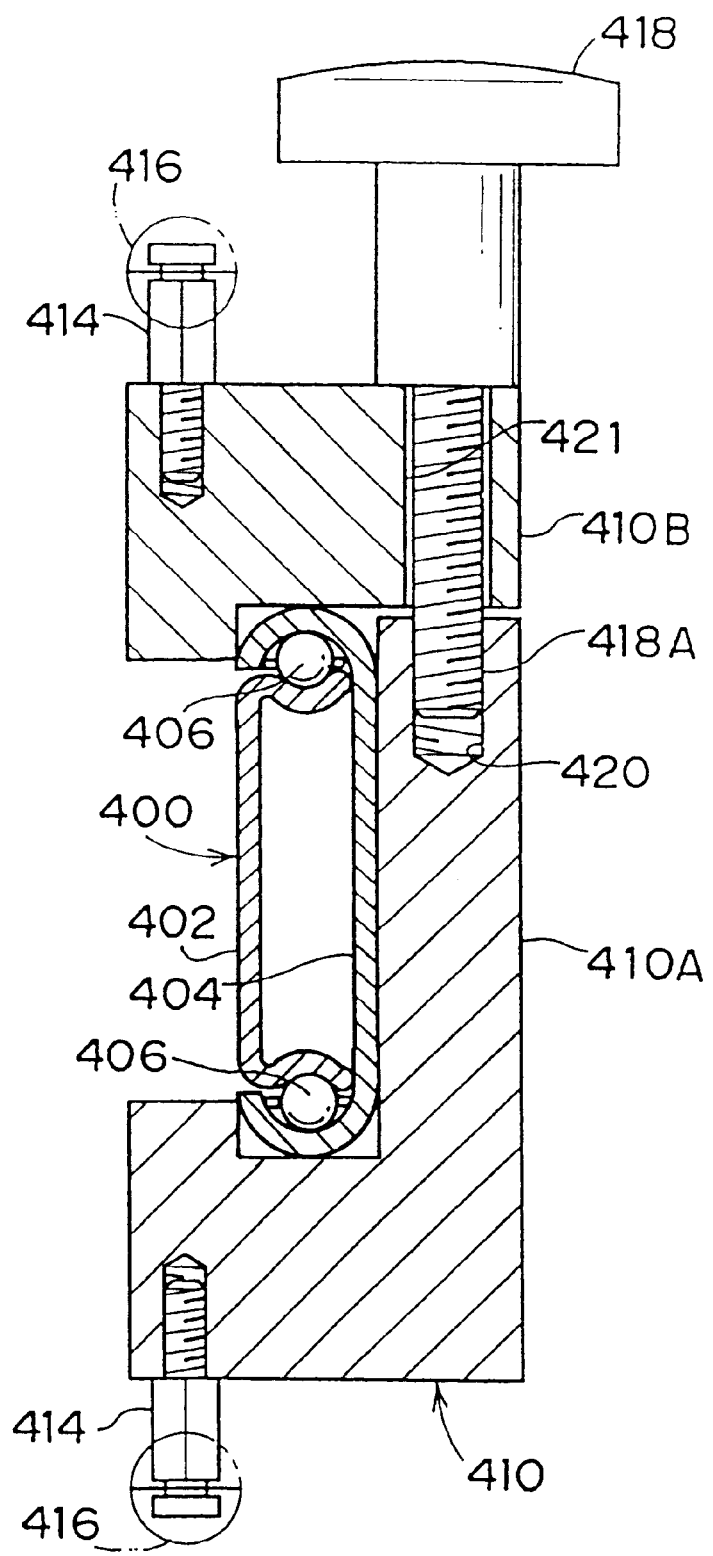
FIG. 24 is a cross-sectional view of a stopper block portion of the jig.

As illustrated in FIG. 24, the stopper block 410 is formed from a first member 410A, a second member 410B, and a screw 418 having a handle.

A female screw 420 is formed in the first member 410A. A screw portion 418A, of the screw 418 having a handle which is inserted into a through hole 421 of the second member 410B, is screwed into the female screw 420. In this way, the first member 410A and the second member 410B are fastened and the stopper block 410 is fixed to the outer member 404.

When the screw 418 having a handle is rotated in the direction of the screw portion 418A coming out from the female screw 420 such that the screw 418 having a handle is loosened, the stopper block 410 can be slid in the longitudinal direction of the outer member 404.

Figure 25:
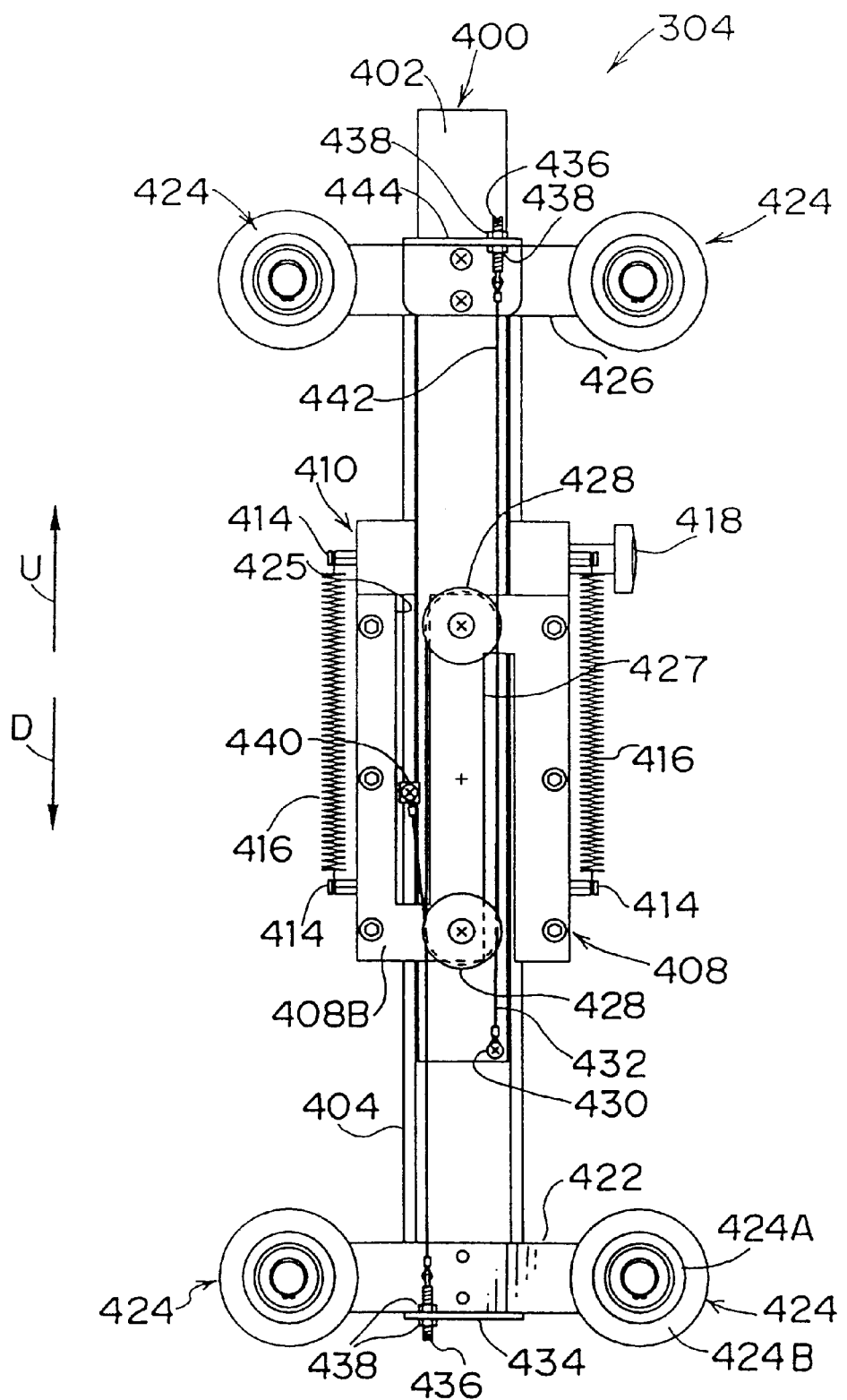
FIG. 25 is a plan view as seen from a reverse surface of the jig.
Figure 26:
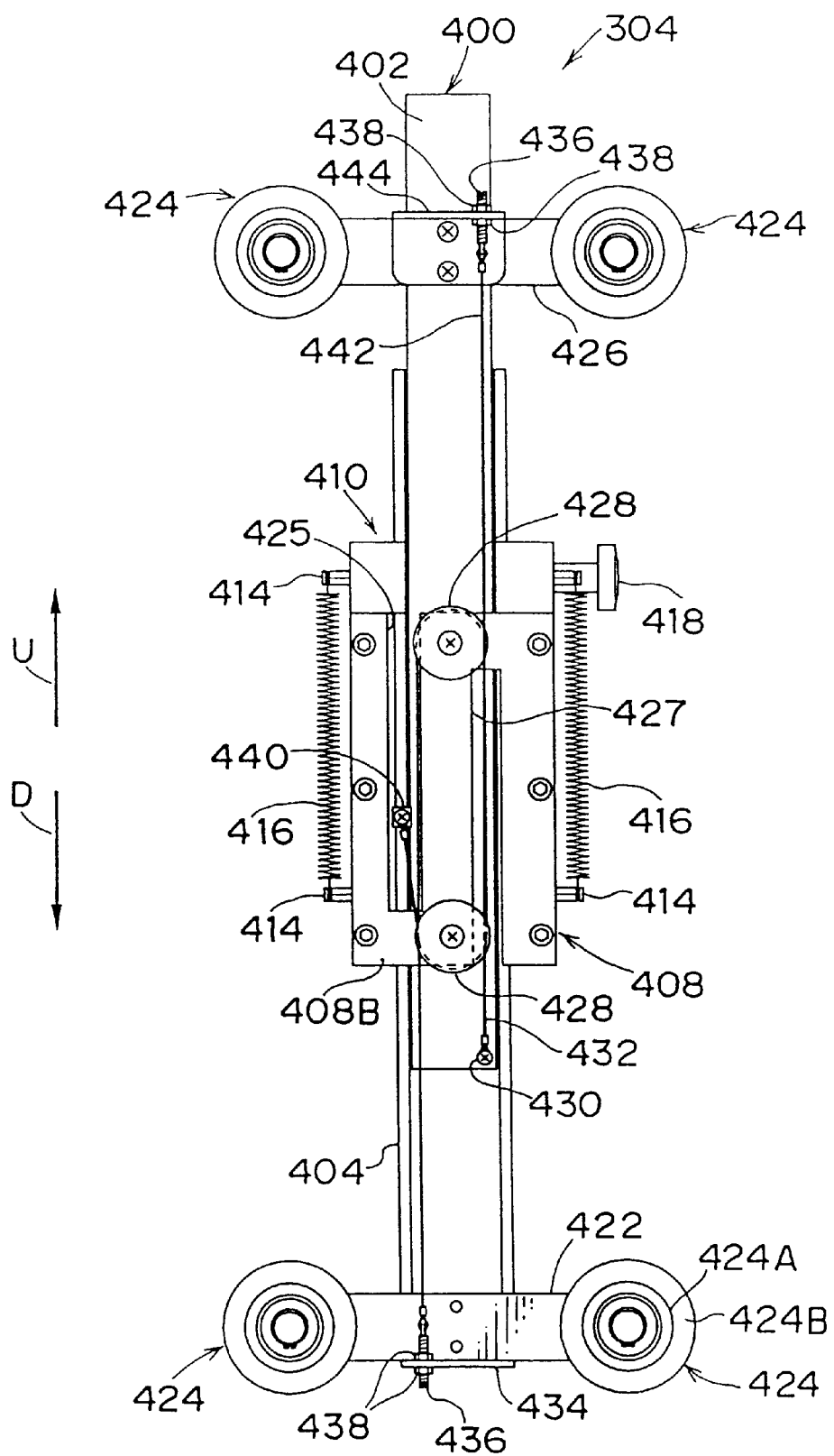
FIG. 26 is a plan view as seen from the reverse surface of the jig.

Accordingly, as illustrated in FIGS. 25 and 26, the stopper block 410 can be fixed to any arbitrary position of the outer member 404.

As shown in FIGS. 22 through 24, a grooved pin 414 is fixed to each of the side surfaces of the center block 408 and the side surfaces of the stopper block 410.

At each of the side surfaces, the grooved pin 414 of the center block 408 and the grooved pin 414 of the stopper block 410 are connected by a tension spring 416. The tension springs 416 pull the center block 408 and the stopper block 410 in directions of approaching one another. Accordingly, usually, the center block 408 abuts the stopper block 410 (see FIGS. 22, 25, 26).

As illustrated in FIG. 22, an elongated hardware 422 with rollers is mounted to the arrow D direction side end portion of the outer member 404 in a direction orthogonal to the longitudinal direction of the outer member 404. A flanged roller 424, in which a bearing (not shown in the drawings) is housed, is rotatably mounted to each end portion of the hardware 422 with rollers.

An elongated hardware 426 with rollers is mounted to the arrow U direction side end portion of the inner member 402 in a direction orthogonal to the longitudinal direction of the inner member 402. The flanged roller 424, which is the same as that of the outer member 404, is rotatably mounted to each end portion of the hardware 426 with rollers.

Figure 28:
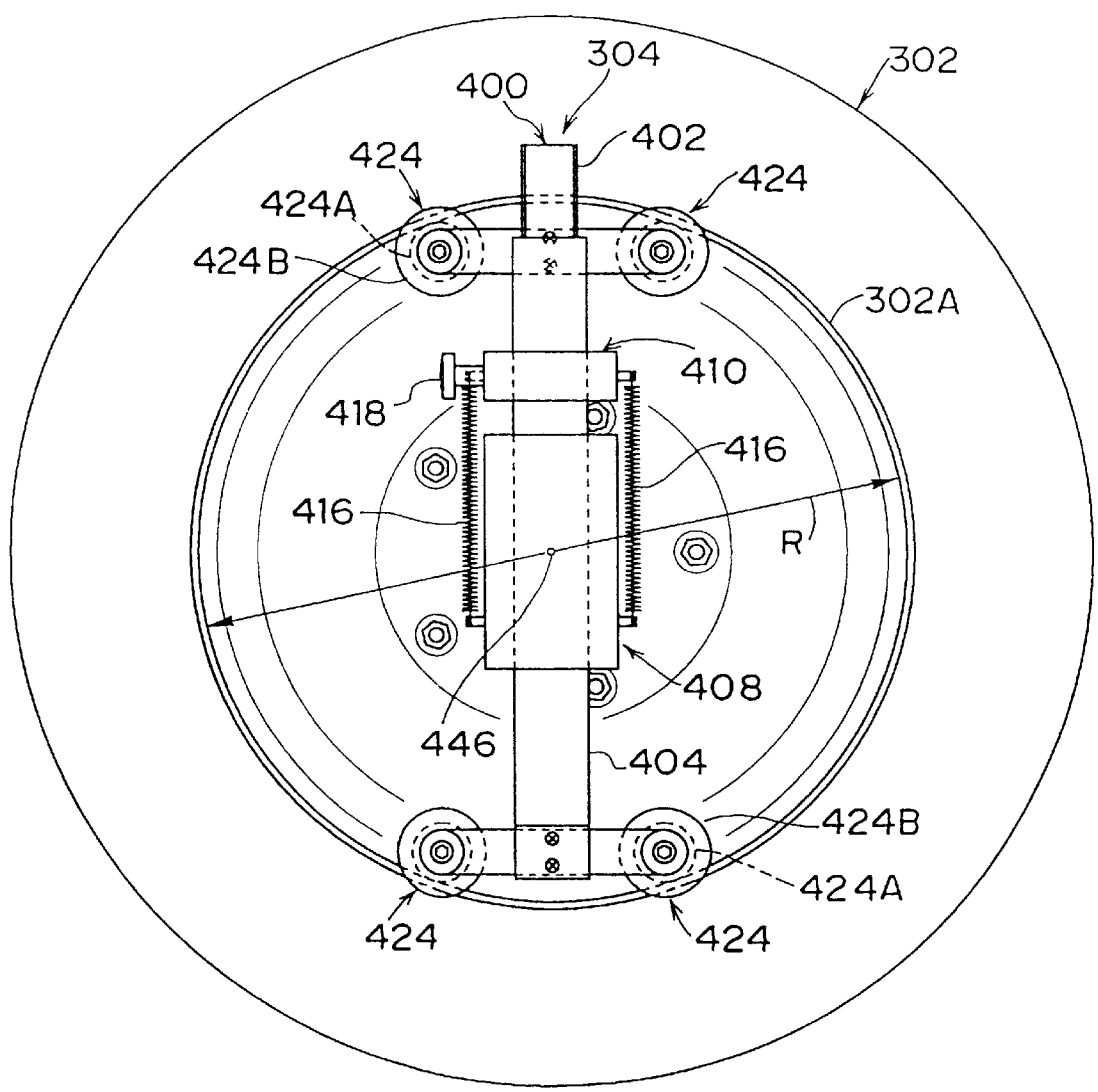
FIG. 28 is a front view of the wheel and the jig.

As shown in FIG. 22, at the flanged roller 424, a flange 424B is provided integrally with one end side of a small-diameter portion 424A. As shown in FIG. 21 and FIG. 28, a portion of the small-diameter portion 424A side surface of the flange 424B abuts the wheel axial direction outer side end of a disk wheel flange (rim flange) 302A of the wheel 302. The outer peripheral surface of the small diameter portion 424A abuts the inner peripheral surface of the disk wheel flange 302A.

Further, a rubber ring 424C for preventing slipping is mounted to the outer peripheral surface of the small-diameter portion 424A as illustrated in FIG. 22.

As illustrated in FIGS. 22 and 25, a first groove 425, which extends from the arrow U direction side in the direction of arrow D, and a second groove 427, which extends from the arrow D direction side in the direction of arrow U, are formed in the plate 408B of the center block 408.

The first groove 425 is a relief for a wire anchoring pin 440 which will be described later. The second groove 427 is a relief for a wire anchoring pin 430 which will be described later.

A pulley 428 is mounted so as to be freely rotatable in a vicinity of the arrow U direction side end portion and in a vicinity of the arrow D direction side end portion of the second block 408 on a transverse direction central line of the center block 408.

The wire anchoring pin 430 is fixed to a vicinity of the arrow D direction side end portion of the inner member 402. One end of a first wire 432 is anchored on the wire anchoring pin 430.

A wire mounting hardware 434 is mounted to the arrow D direction end portion of the outer member 404.

A female screw (not shown in the drawings) is formed in the wire mounting hardware 434. A long screw 436 is screwed into this female screw.

The other end of the first wire 432 is anchored on an end portion of the long screw 436. An intermediate portion of the first wire 432 is trained around the arrow U direction side pulley 428. Two nuts 438 for preventing loosening are screwed together with the long screw 436.

As illustrated in FIG. 23 and FIG. 25, the wire anchoring pin 440 is fixed to the substantially intermediate portion in the longitudinal direction of the outer member 404. One end of a second wire 442 is anchored to the wire anchoring pin 440.

A wire mounting hardware 444 is mounted to the hardware 426 with rollers, of the inner member 402.

In the same way as the wire mounting hardware 434, a long screw 436 and nuts 438 are mounted to the wire mounting hardware 444. The other end of the second wire 442 is anchored to the long screw 436. An intermediate portion of the second wire 442 is trained around the arrow D direction side pulley 428.

Figure 29:
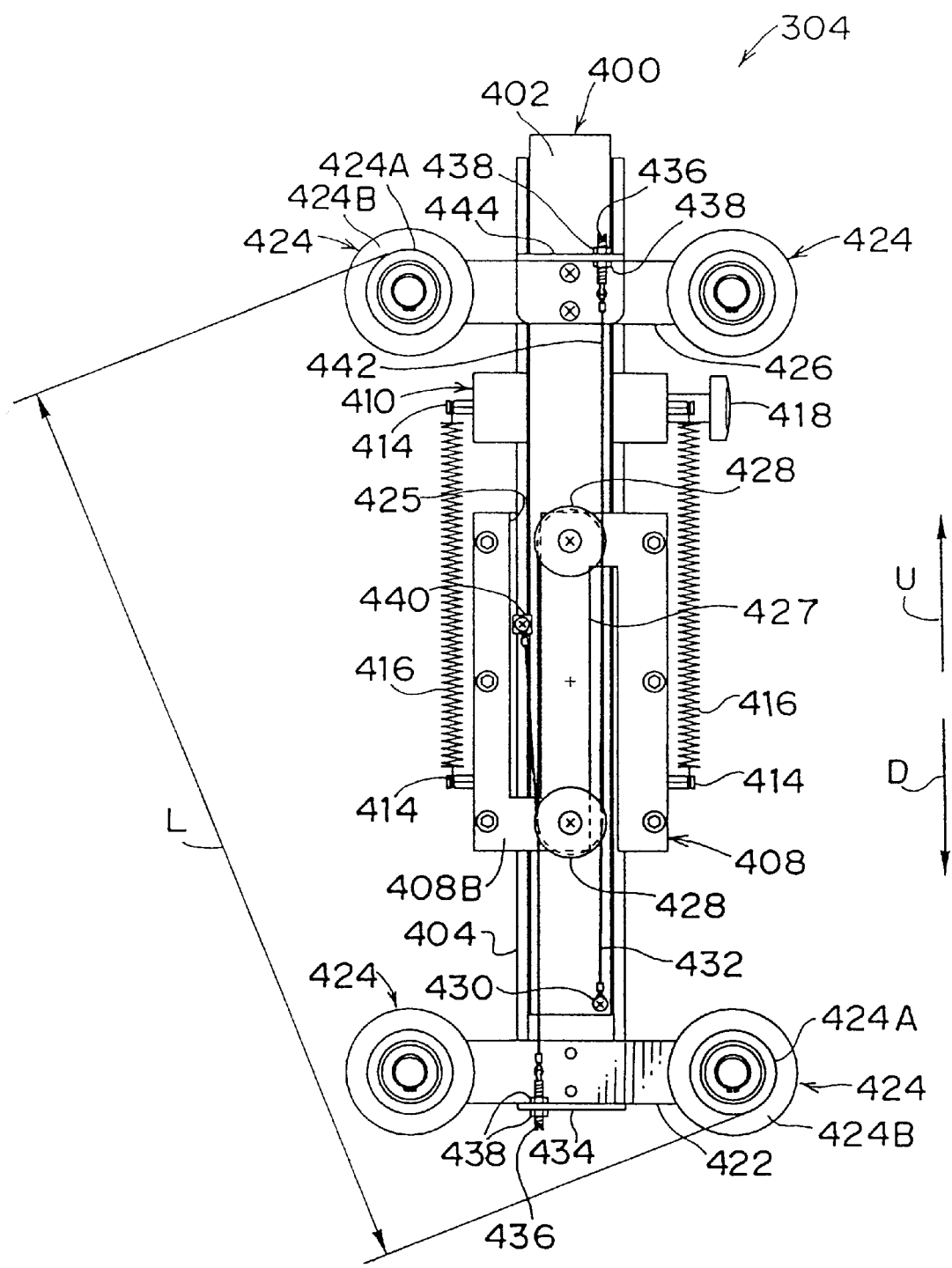
FIG. 29 is a plan view as seen from the reverse surface of the jig.

Here, for example, in the jig 304 in the state illustrated in FIG. 26, when the arrow U direction side flanged rollers 424 and the arrow D direction side flanged rollers 424 are made to approach one another, as illustrated in FIG. 29, the inner member 402 and the outer member 404 relatively move along the longitudinal direction. The center bock 408 is moved with respect to the outer member 404 so as to always be positioned between the arrow U direction side pulley 428 and the arrow D direction side pulley 428.

At this time, because the center block 408 moves in a direction of separating from the stopper block 410, the tension springs 416 extend and urge the arrow U direction side flanged rollers 424 and the arrow D direction side flanged rollers 424 in directions of moving apart.

Figure 27:
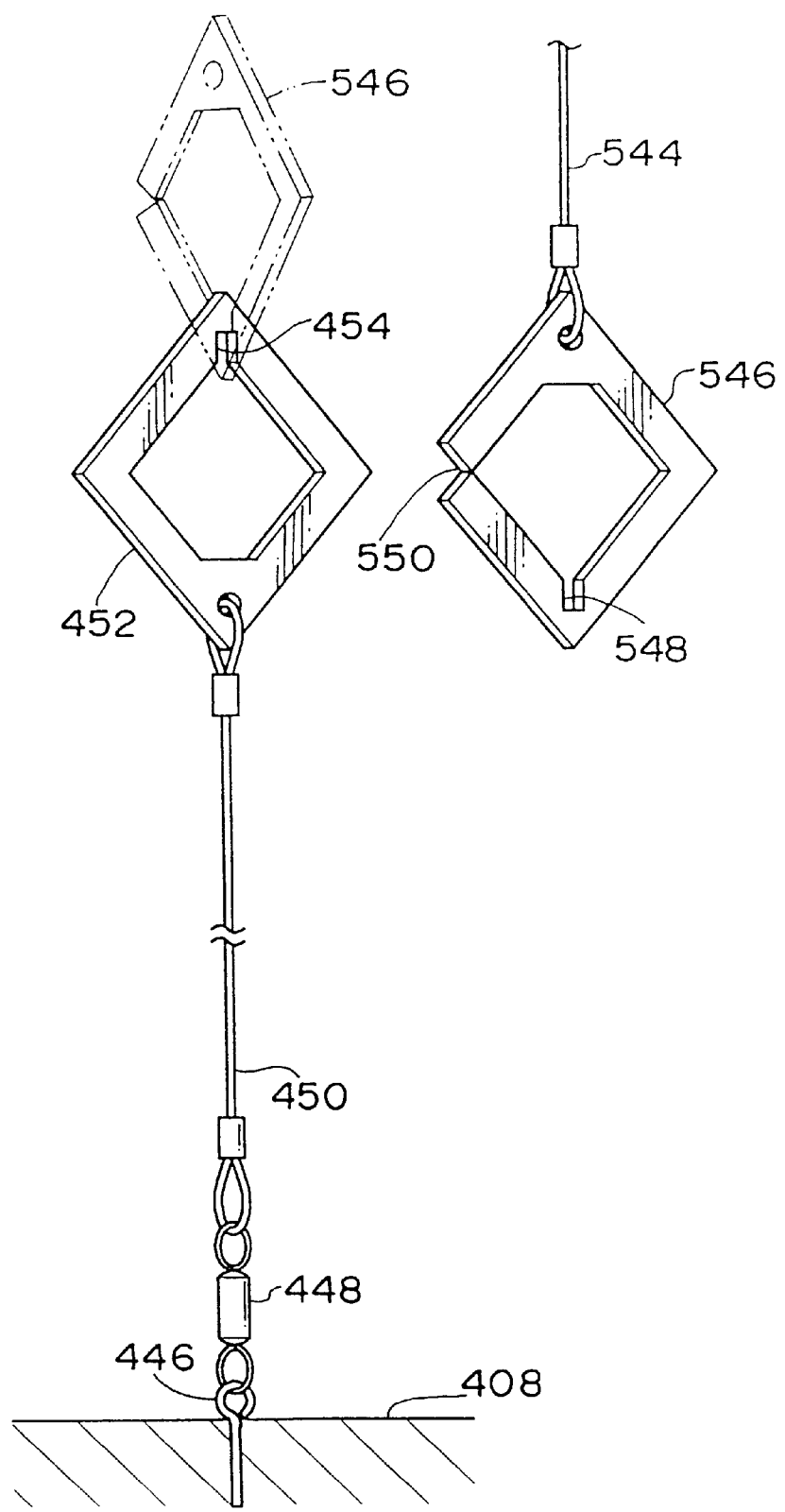
FIG. 27 is a perspective view of a first anchoring hardware and a second anchoring hardware.

As illustrated in FIGS. 21 and 27, one end of a swivel (torsion preventer) 448 is anchored, via a hook 446, to a portion of the center block 408 between the arrow U direction side flanged rollers 424 and the arrow D direction side flanged rollers 424.

The hook 446 is fixed to the center of the center block 408, and is always positioned between the arrow U direction side flanged rollers 424 and the arrow D direction side flanged rollers 424. As shown in FIG. 21 and FIG. 28, when the four flanged rollers 424 abut the inner peripheral surface of the disk wheel flange 302A of the wheel 302, the hook 446 is always positioned on an imaginary line extending from the rotational axis of the wheel 302.

One end of a first wire 450 for measurement is connected to the other end of the swivel 448.

A first anchoring hardware 452, which is formed as a substantially diamond-shaped frame, is connected to the other end of the first wire 450 for measurement.

A notch 454, which has a width corresponding to the plate thickness of a second anchoring hardware 546 which will be described later, is formed at the side of the hole portion of the first anchoring hardware 452 which side is opposite the side at which the first wire 450 for measurement is connected.

Distance Measuring Device

Next, the structure of a distance measuring device 240 will be described in detail.

As illustrated in FIG. 14, a distance measuring device 240 is provided at each tire driving device 118.

Figure 30:
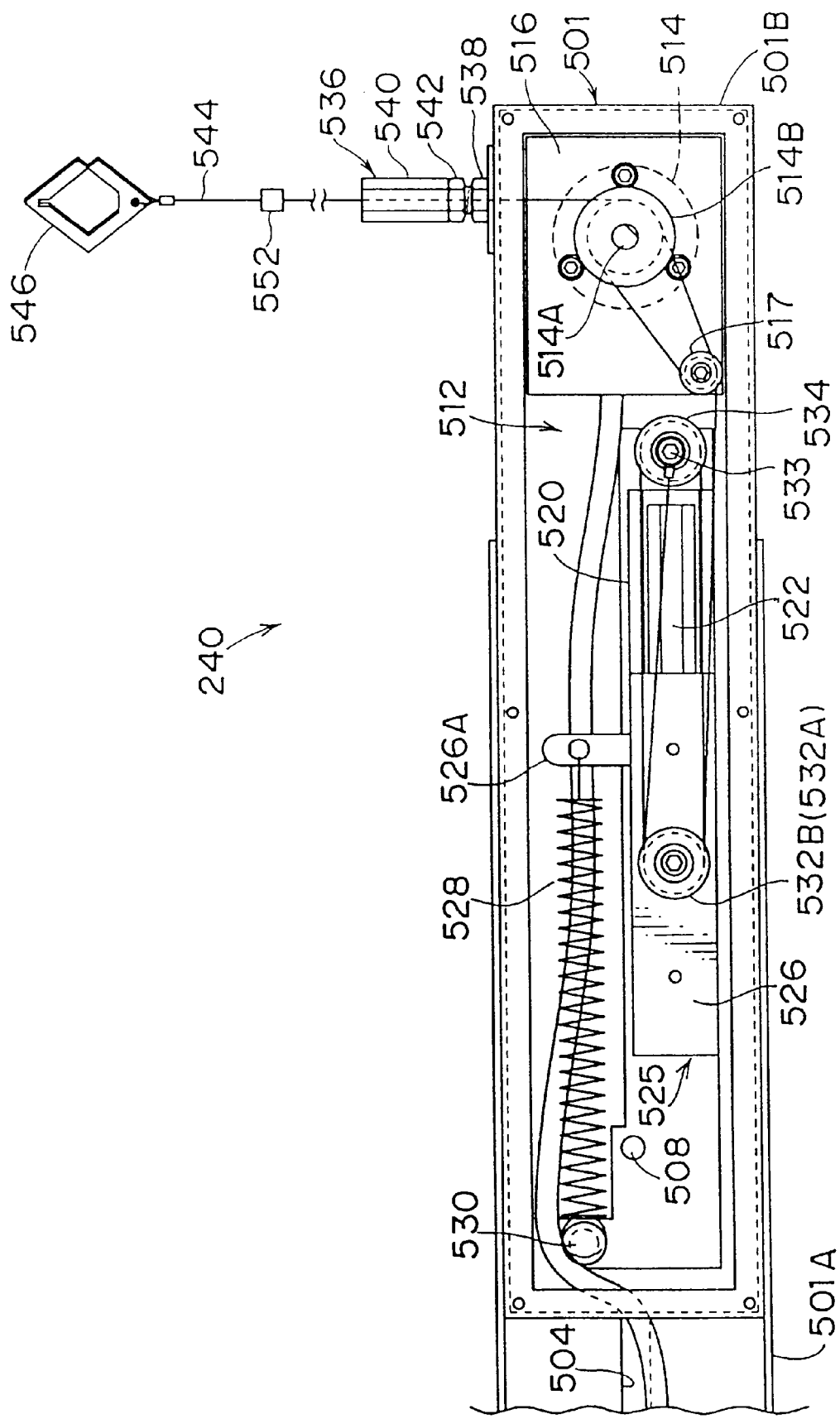
FIG. 30 is a front view of a distance measuring device whose cover has been removed.
Figure 31:
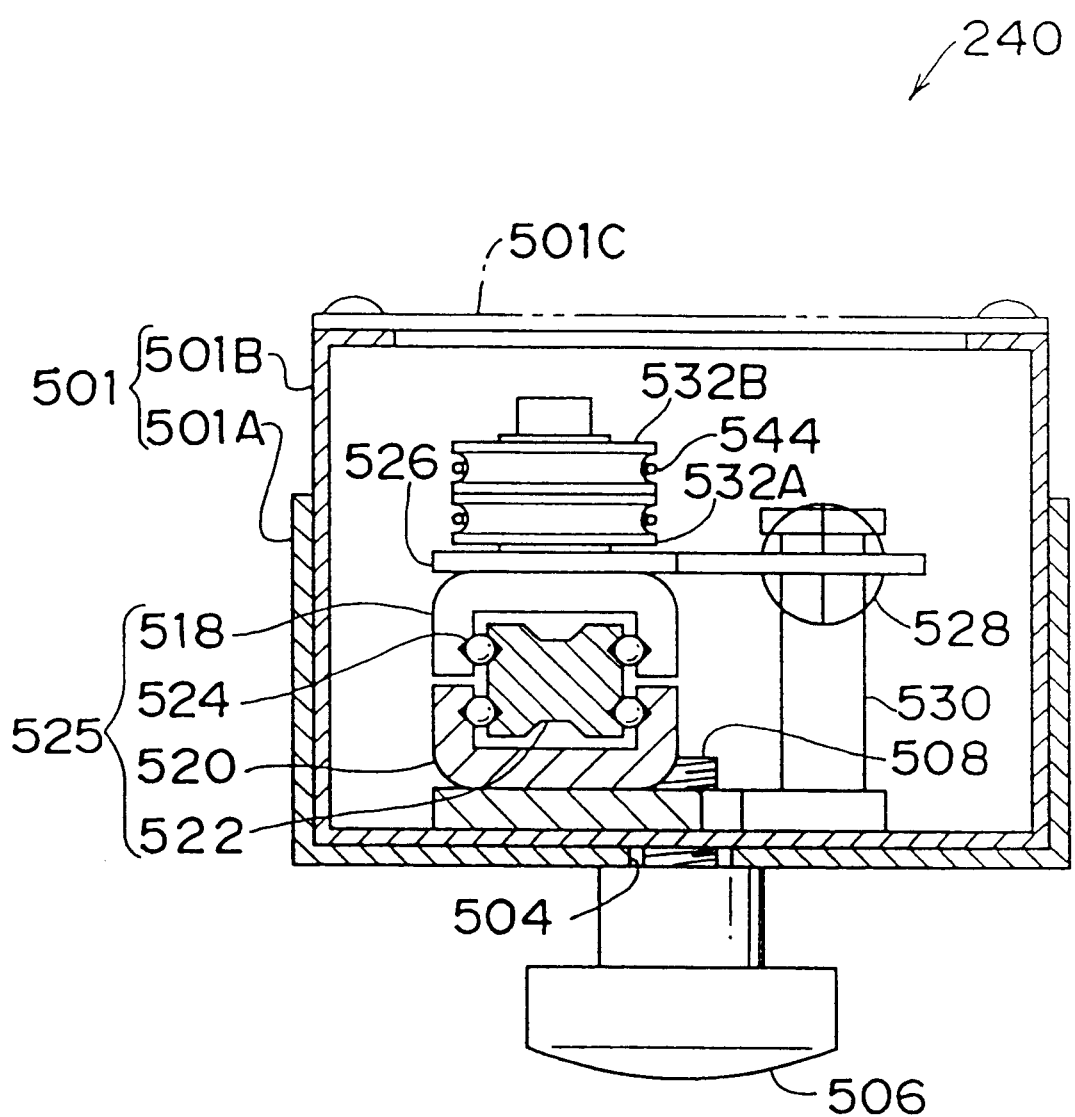
FIG. 31 is a cross-sectional view taken in a direction orthogonal to a longitudinal direction of the distance measuring device.

As illustrated in FIGS. 30 and 31, the distance measuring device 240 includes a rod 501 which is freely extendible and contractible. The rod 501 is formed by a first case 501A which is elongated and has a substantially U-shaped cross-sectional configuration, and a second case 501B which is formed in an elongated, box-shaped configuration and is inserted in the first case 501A so as to be freely slidable therein.

One side surface of the second case 501B is open, and the open portion is usually closed by a cover 501C being mounted to the second case 501B by screws.

As illustrated in FIG. 14, a cylindrical base portion 500 is mounted integrally to one end of the first case 501A.

A female screw (not shown in the drawings) is formed on the side surface of the supporting stand 246. A male screw (not shown in the drawings) of screw 502, to which a lever is attached and which passes through a hole (not shown in the drawings) in the base portion 500, screws together with this female screw.

As a result, the rod 501 is rotatable around the male screw portion of the screw 502 to which the lever is attached. When the screw 502 to which a lever is attached is rotated and the male screw is screwed into the female screw, the base portion 500 is pushed against the side surface of the supporting stand 246, and the rod 501 is thereby fixed at an arbitrary orientation.

As illustrated in FIGS. 30 and 31, a long hole 504 is formed in the first case 501A along the longitudinal direction thereof. A male screw 508 of a screw 506, which has a handle and which is inserted through the long hole 504, is screwed in a female screw (not shown in the drawings) formed in the second case 501B.

Thus, when the screw 506 with a handle is rotated and the male screw 508 is screwed into the female screw formed in the second case 501B, the second case 501B is fixed to the first case 501A. When the male screw 508 is loosened, the second case 501B can move along the longitudinal direction.

The second case 501B is provided with a distance measuring means 512.

The distance measuring means 512 has a block 516 which fixes a rotary encoder 514 at a distal end side of the second case 501B. A pulley 514B is mounted to a rotating shaft 514A of the rotary encoder 514.

A small pulley 517 is rotatably provided at the block 516 in a vicinity of the pulley 514B.

A linear slide bearing 525 is mounted to the second case 501B at the side of the rotary encoder 514.

The linear slide bearing 525 has an elongated first member 518, an elongated second member 520 and an intermediate member 522.

A plurality of steel balls 524 are disposed between the first member 518 and the intermediate member 522, and between the second member 520 and the intermediate member 522. The second member 520 is fixed to the second case 501B, and the first member 518 freely slides smoothly along the longitudinal direction of the second member 520.

A plate member 526 is fixed to the first member 518. One end of a tension spring 528 is anchored on a projection 526A provided at a side portion of the plate member 526.

The other end of the tension spring 528 is anchored on a pin 530 which is fixed to the second case 501B and which is provided at the side opposite the rotary encoder 514 side. The plate member 526 and the first member 518 are always pulled toward the pin 530 side.

A pulley 532A and a pulley 532B are mounted, so as to be freely rotatable and so as to be disposed one on the other, to the center of the plate member 526. A shaft 533, which is fixed to the second case 501B, is provided between the second member 520 and the rotary encoder 514. A pulley 534 is rotatably mounted to the shaft 533.

As illustrated in FIG. 30, a wire opening 536 is provided at the side surface of the second case 501B. The wire opening 536 has a hollow shaft 538 which is hollow and fixed to the side surface of the second case 501B.

A male screw is formed at a portion of the outer peripheral surface of the hollow shaft 538. An elongated adjustment nut 540 and a fixing nut 542, which fixes the adjustment nut 540, are screwed together with this male screw portion.

A second wire 544 for measurement is inserted through the hollow shaft 538 of the wire opening 536.

Figure 32:
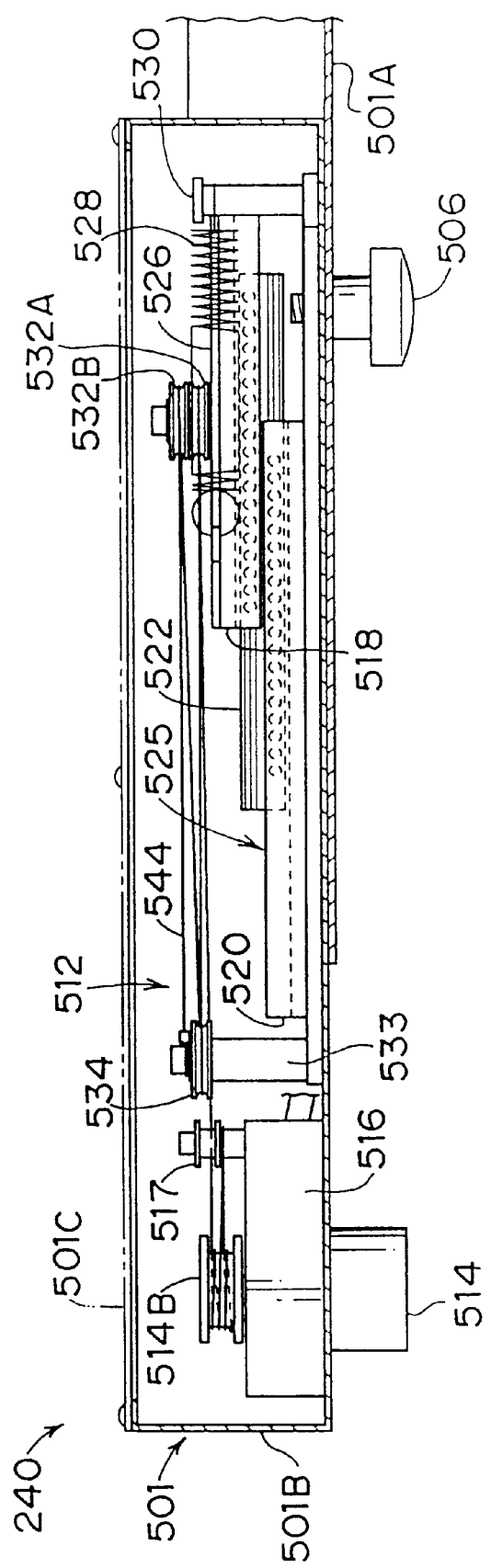
FIG. 32 is a cross-sectional view taken along the longitudinal direction of the distance measuring device.

As illustrated in FIGS. 30 and 32, the second wire 544 for measurement, which extends from the wire opening 536 toward the interior of the second case 501B, is first trained around the pulley 514B of the rotary encoder 514 and the small pulley 517, and around the pulley 514B again in a clockwise direction, and thereafter, is trained around the pulley 532A, the pulley 534 and the pulley 532B, and thereafter, the end portion is anchored on the shaft 533 which is fixed to the second case 501B and which supports the pulley 534.

The second anchoring hardware 546, which is formed in a substantially diamond-like frame shape and which engages with the first anchoring hardware 452, is mounted to the end portion of the second wire 544 for measurement which extends from the wire opening 536 toward the outer side of the second case 501B.

As illustrated in FIG. 27, a notch 548, which is of a thickness corresponding to the plate thickness of the first anchoring hardware 452, is formed at a portion of the second anchoring hardware 546 at the side of the hole portion, which side is opposite the side at which the second anchoring hardware 546 is connected with the second wire 544 for measurement. A cut-out 550, which passes through from the exterior to the interior (or from the interior to the exterior) of the frame portion, is formed in one portion of the second anchoring hardware 546. The cut-out 550 is substantially closed, and opens by the second anchoring hardware 546 being elastically deformed.

As shown in FIG. 30, a stopper hardware 552 is fixed by caulking to the intermediate portion of the second wire 544 for measurement which extends from the wire opening 536 toward the outer side of the second case 501B.

Due to the action of the tension spring 528, tension, for pulling-in the second wire 544 for measurement from the wire opening 536 into the second case 501B, is applied to the second wire 544 for measurement.

As shown in FIG. 30, the pulley 532A and the pulley 532B, around which the second wire 544 for measurement is trained, serve as a running pulley (the other pulleys serve as fixed pulleys). In the present embodiment, because the second wire 544 for measurement is trained around the pulley 532A and the pulley 532B, the dimension of movement of the pulley 532A and 532B (along the longitudinal direction of the second case 501B) is 1/4 of the dimension over which the second wire 544 for measurement is pulled out from the wire opening 536 toward the outer side.

The second wire 544 for measurement is trained around the pulley 514B of the rotary encoder 514 with tension applied to the second wire 544 for measurement. Thus, when the second wire 544 for measurement is pulled out, the rotating shaft 514A of the rotary encoder 514 rotates by an angle which corresponds to the amount by which the second wire 544 for measurement is pulled out.

Figure 33:
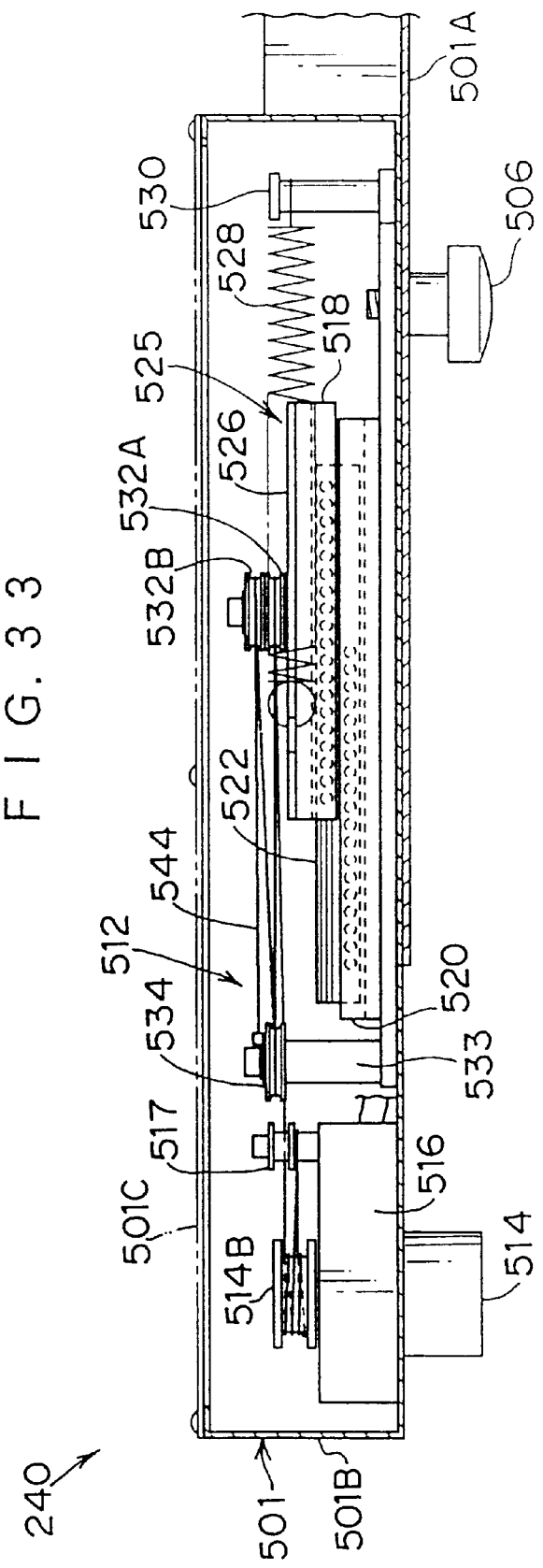
FIG. 33 is a cross-sectional view taken along the longitudinal direction of the distance measuring device.

FIG. 30 and FIG. 33 illustrate the state in which the second wire 544 for measurement is pulled out. However, usually, the stopper hardware 552 abuts the end portion of the wire opening 536, and as illustrated in FIG. 32, the first member 518 to which the pulley 532A and the pulley 532B are mounted is positioned at the pin 530 side. (Even in the state in which the stopper hardware 552 abuts the end portion of the wire opening 536, tension is applied to the second wire 544 for measurement.)

The rotary encoder 514 converts the angle of rotation of the rotating shaft 514A into an electric signal, and outputs the results of measurement to the control device 126. The pulled-out amount of the second wire 544 for measurement is thereby measured precisely and accurately.

The distance measuring means 512 is set such that, in a state in which the stopper hardware 552 abuts the end portion of the wire opening 536, the pulled-out amount of the second wire 544 for measurement is set to zero.

Operation

Next, an example of a method of adjusting wheel alignment by using the above-described wheel alignment adjusting device 10 will be described.

(1) In the initial state of the wheel alignment adjusting device 10, as illustrated in FIG. 8, the loading stand 18 is lowered to the lowermost position, and the second sub-base 70 is disposed on the loading stand 18.

In this state, the pins 84 of the arrow B direction side movably supported tire driving devices 118 are inserted in the holes 80 of the plate members 82 provided at the end portions of the second transfer plates 78. The second transfer plates 78 connect the arrow F direction side tire driving devices 118 and the arrow B direction side tire driving devices 118. The upper surfaces of the second transfer plates 78 and the upper surfaces of the front and back tire driving devices 118 substantially coincide with one another.

The first transfer plates 68 are connected to the arrow B direction side end portion of the loading stand 18 and to the arrow B direction side tire driving devices 118. Thus, the top surfaces of the first transfer plates 68, the second transfer plates 78, and the front and back tire driving devices 118 substantially correspond to one another.

(2) An operator measures the wheel base and the front and rear tread bases of the vehicle 300 which is the object of adjustment. The operator changes the distance between the front and rear tire driving devices 118 in accordance with the wheel base, and changes the distance between the left and right tire driving devices 118 in accordance with the tread base.

The changing of the distance between the left and right tire driving devices 118 is carried out as follows.

(A) The solenoids 52 of the lock devices 50 are energized, the teeth 54 separate from the racks 48, and the first sub-base 34R is set in a movable state (unlocked state).
(B) The solenoid 46 is energized, and the wire rope 40 is grasped by the grasping claw 44.
(C) The handle 42 is rotated, the wire rope 40 is made to circulate, and the left/right positional adjustment of the first sub-base 34R is carried out in accordance with the tread base.
(D) The solenoid 46 is set in a non-energized state, and the grasping claw 44 releases the wire rope 40.
(E) The solenoids 52 of the lock devices 50 are set in a non-energized state, the teeth 54 engage with the racks 48, and the first sub-base 34R is locked at both the arrow F direction side end portion and the arrow B direction side end portion. The changing of the distance between the left and right tire driving devices 118 is thus completed.

Here, in the wheel alignment adjusting device 10 of the present embodiment, either the left or the right tire driving devices 118 are fixed (the tire driving devices 118 provided at the first sub-base 34L are fixed), and the other tire driving devices 118 (those provided at the first sub-base 34R) are moved in the left and right directions. Thus, as compared with a case in which the tire driving devices 118 at both the left side and the right side are moved, the tire driving devices 118 can be positioned more accurately.

Further, the first sub-frame 34R is fixed to the main frame 19 (the racks 48) of the loading stand 18 by the lock devices 50 at both the arrow F direction side end portion and the arrow B direction side end portion of the first sub-base 34R. Thus, the positions of the tire driving devices 118 disposed on the first sub-base 34R do not move due to external force or the like.

Changing of the distance between the front and rear tire driving devices 118 is carried out as follows.

The motor unit 66 is driven such that the two arrow B direction side tire driving devices 118 are moved forward or backward. The distance between the arrow F direction side tire driving devices 118 and the arrow B direction side tire driving devices 118 is thus adjusted in accordance with the wheel base.

When the driving of the motor unit 66 is stopped, due to the action of the nuts and the feed screws, the tire driving devices 118 are locked so as to not move in the longitudinal direction.

(3) When the positions of the respective tire driving devices 118 have been determined in accordance with the tread base and the wheel base, next, the vehicle 300 is moved onto the loading stand 18 from the direction of arrow B side with the steering wheel of the vehicle 300 set at the position for the vehicle to move straight forward, such that the wheels 302 of the vehicle 300 are positioned on the tire driving surfaces 136 of the tire driving devices 118 and the center line of the vehicle body is substantially parallel to the circulating direction of the endless tracks 134 of the tire driving devices 118.

When the wheels 302 correspond to the tire driving surfaces 136 of the respective tire driving devices 118, the second transfer plates 78 of the second sub-base 70 are positioned beneath the vehicle.

(4) Next, the jigs 304 are mounted to the respective wheels 302. The processes for mounting the jig 304 are as follows. First, as illustrated in FIG. 29, the position of the stopper block 410 (with respect to the jig 304 (the outer member 404)) is fixed such that the maximum dimension L between the small diameter portions 424A of two flanged rollers 424 disposed diagonally to each other is slightly greater than the inner diameter R of the disk wheel flange 302A shown in FIG. 28.

Then, an operator grasps a vicinity of the flanged rollers 424 at one longitudinal direction side of the jig 304 and a vicinity of the flanged rollers 424 at the other side, and brings them closer together. The operator then inserts the jig 304 (the small diameter portions 424A) at the inner side of the disk wheel flange 302A and releases the jig 304. Thus, as illustrated in FIGS. 21 and 28, the four flanged rollers 424 abut the disk wheel flange 302A. The hook 446 is thereby positioned at the axial center of the wheel 302.

Each of the rods 501 are manually rotated, extended or contracted, and fixed such that the wire opening 536 of the rod 501 is disposed on the central axis of the wheel 302 (i.e., such that the wire opening 536 opposes the hook 446).

Then, the second wire 544 for measurement is pulled out, the second anchoring hardware 546 is made to catch on the first anchoring hardware 452 of the jig 304, and the notch 548 and the notch 454 are inserted into one another (see FIG. 27). Because tension is applied to the second wire 544 for measurement, the first wire 450 for measurement and the second wire 544 for measurement are disposed on a single straight line.

(5) When the above operations have been completed, the operator instructs the control device 126 that wheel alignment measurement is to be carried out.

Figure 16:
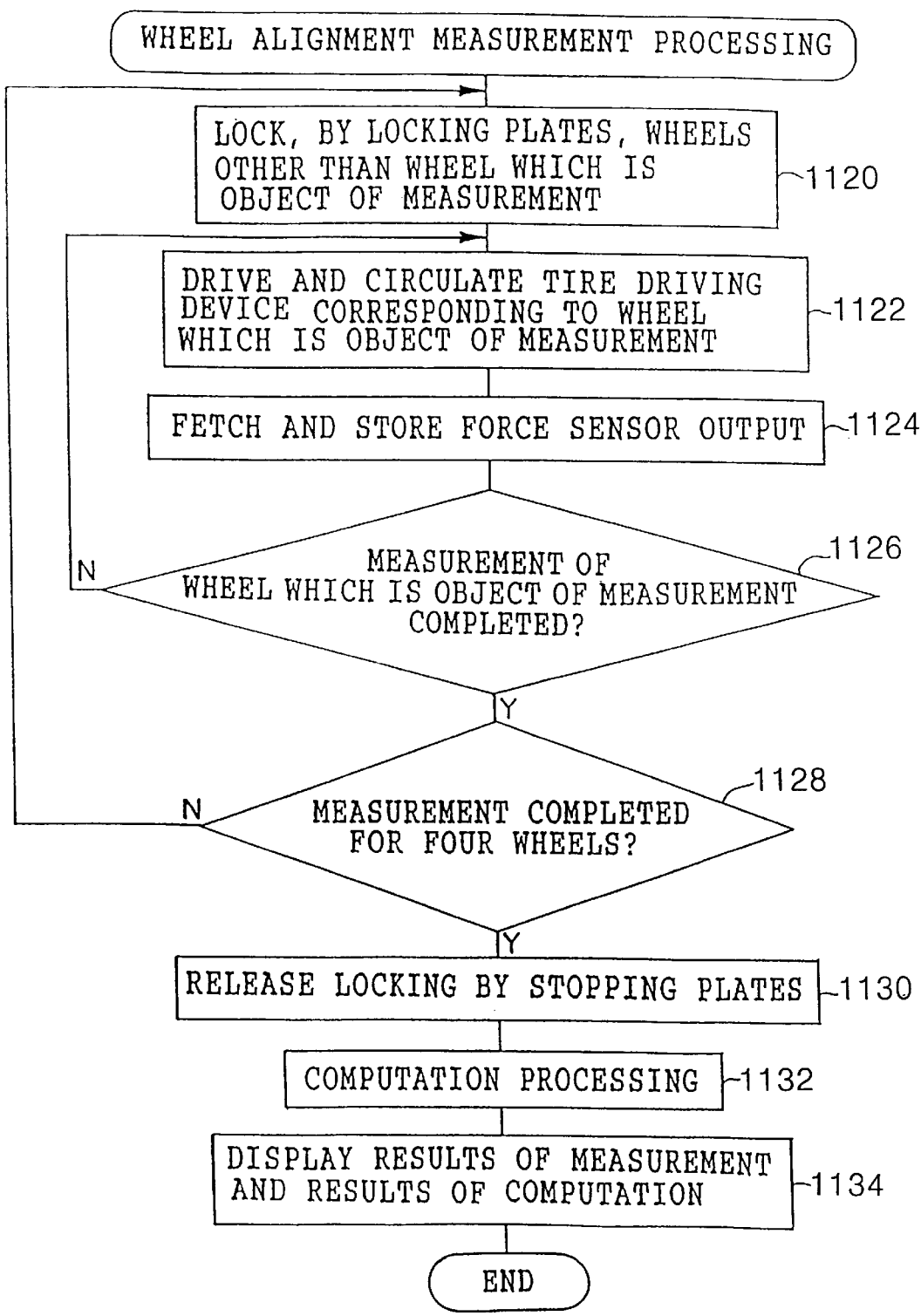
FIG. 16 is a flowchart showing wheel alignment measurement processing.
Figure 17:
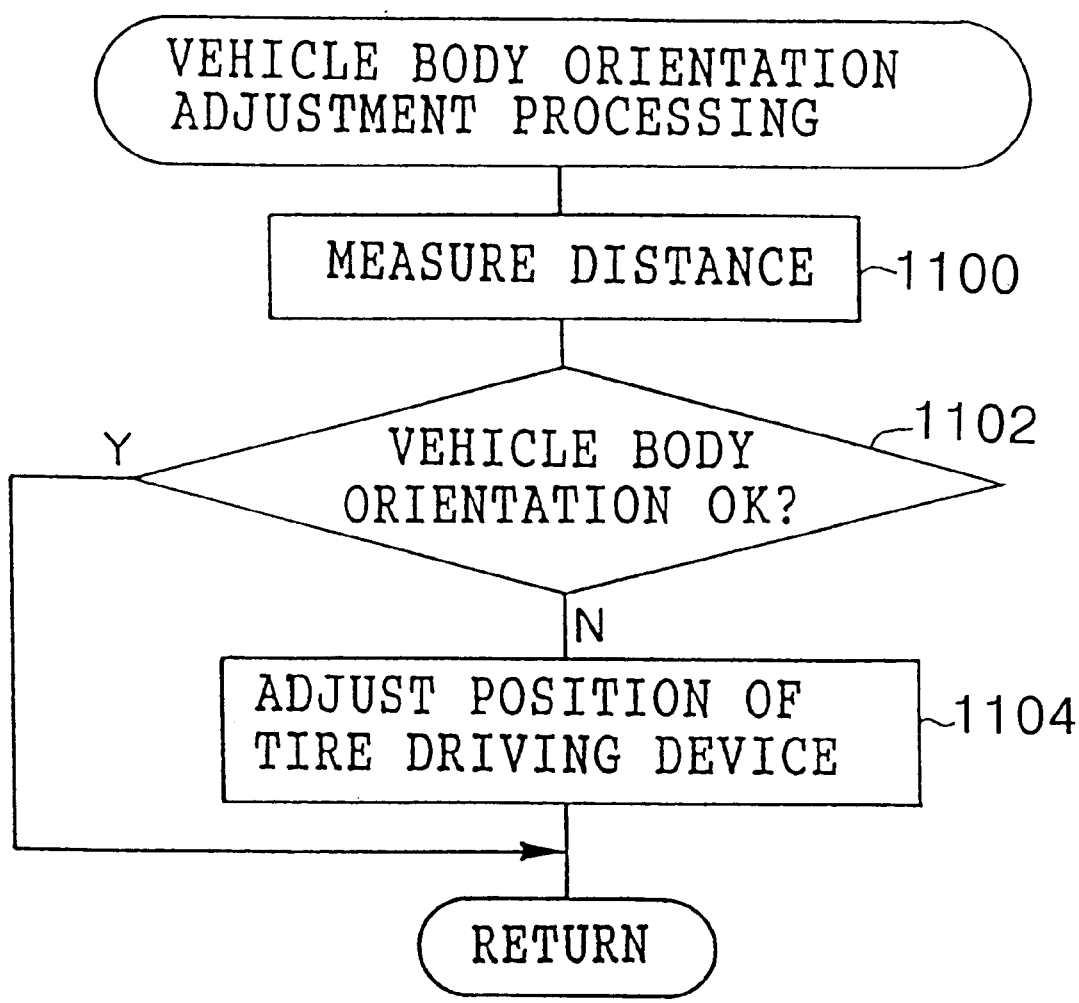
FIG. 17 is a flowchart showing vehicle body orientation adjustment processing.
Figure 18:
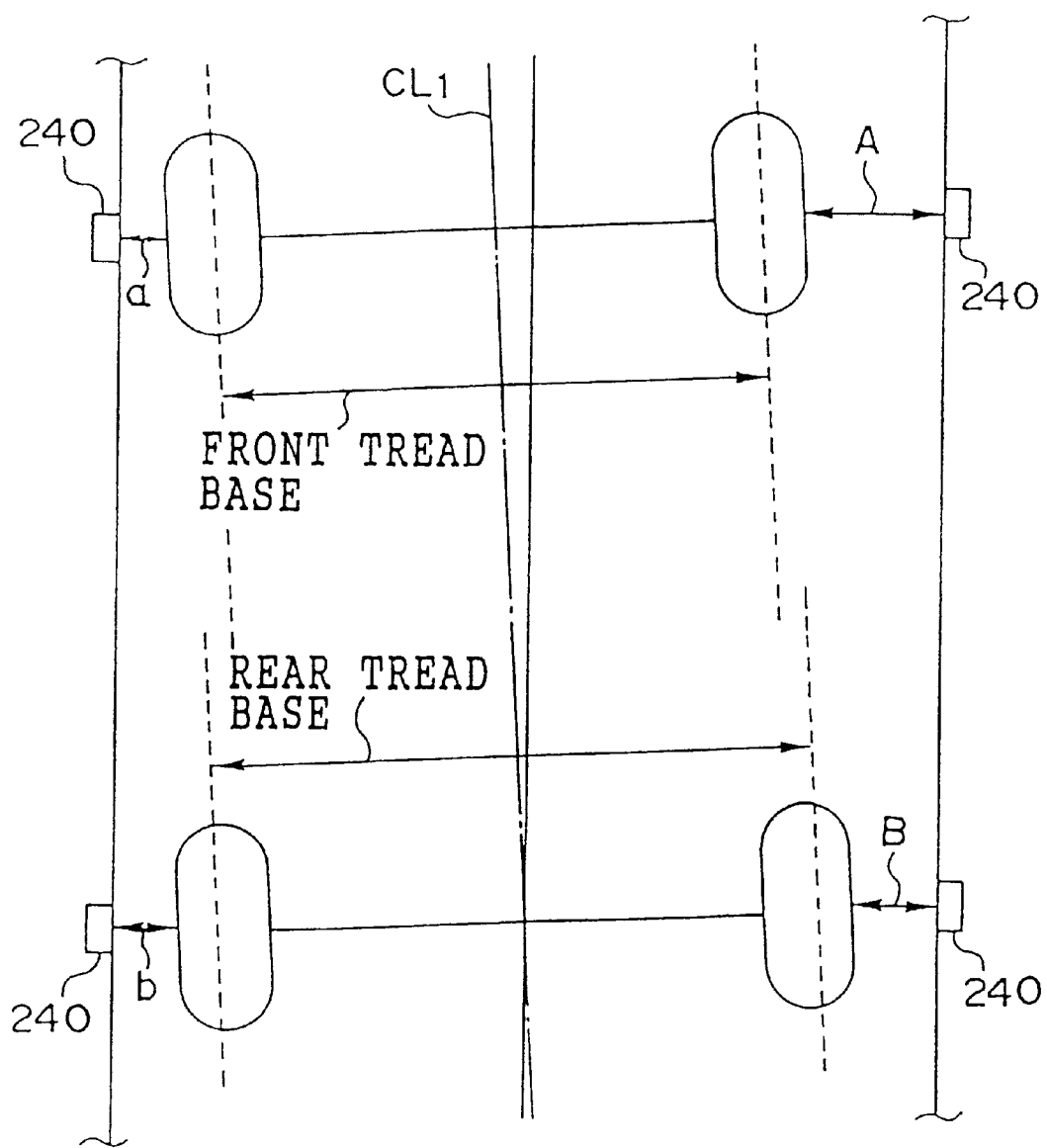
FIG. 18 is a view for explaining how vehicle body orientation is adjusted.

In this way, the control device 126 carries out in order the steps of the wheel alignment measurement processing shown in FIG. 16, and periodically carries out, each time a predetermined period of time passes, the vehicle body orientation adjustment processing illustrated in FIG. 17.

Hereinafter, the vehicle body orientation adjustment processing will be described with reference to FIG. 17.

In step 1100, for each of the wheels 302, the distances from the distance measuring device 240 to the wheel 302 (the distances a, b, A, B in FIG. 18) are measured by the distance measuring device 240. (In actuality, the pulled-out amount of the second wire 544 for measurement of each distance measuring means 512 is measured.)

In the wheel alignment adjusting device 10 of the present embodiment, the jig 304 is mounted to the disk wheel flange 302A which is a rigid body. The second wire 544 for measurement, which has been pulled out from the distance measuring device 240, is connected to the first wire 450 for measurement whose end portion is anchored on the axial center of the wheel 302. The pulled-out amount of the second wire 544 for measurement, to which tension is being applied, is measured by the rotary encoder 514. Thus, the dimensions can be measured precisely and accurately.

In step 102, the value (a−b), which is a value equal to the distance b at the left rear wheel subtracted from the distance a at the left front wheel, and the value (A−B), which is a value equal to the distance B at the right rear wheel subtracted from the distance A at the right front wheel, are compared. On the basis of the results of comparison, a determination is made as to whether the vehicle body is correctly oriented.

If (a−b)=(A−B) in step 102, even if the tread base of the front wheels of the vehicle 300 and the tread base of the rear wheels differ, it can be determined that the center line CL1 of the vehicle body is parallel to the circulating direction of the respective tire driving devices 118 of the wheel alignment measuring device. Thus, the determination is positive, and the vehicle body orientation adjustment processing ends without any processing being carried out.

On the other hand, if (a−b)≠(A−B) in step 102, the determination is negative, and the routine move on to step 104. Distances by which the tire driving devices 118 must be moved in order to establish the relationship (a−b)=(A−B) are computed. On the basis of the results of computation, the motors 182 are driven, and the tire driving devices 118 are moved in the circulating axial direction such that the positions are adjusted.

In the present embodiment, the two arrow F direction side tire driving devices 118 are not moved, and the two arrow B direction side tire driving devices 118 are fixed by the left and right connecting device 310 so as to not be able to move relative to one another. Positional adjustment is carried out by moving, in the circulating axial direction, only the two arrow B direction side tire driving devices 118 which are fixed relative to one another.

However, it is possible to move only the two arrow F direction side tire driving devices 118 and not move the two arrow B direction side tire driving devices 118. Or, position adjustment may be carried out by moving all four front and rear tire driving devices 118.

In this way, the orientation of the vehicle body is adjusted such that the central line CL1 of the vehicle body becomes parallel to the circulating direction of each of the tire driving devices 118 of the wheel alignment measuring device.

Due to the above processes, even if the central line CL1 of the vehicle body of the vehicle 300 which has been moved onto the loading stand 18 is not parallel to the circulating direction of the respective tire driving devices 118, the orientation of the vehicle body can be corrected such that the central line CL1 is made parallel to the circulating direction.

In the wheel alignment measuring processing (FIG. 16) which will be described later, the wheels 302 of the vehicle 300 are made to roll one at a time by the tire driving devices 118.

When the wheels 302 of the vehicle 300 are made to roll one at a time, due to the circulating axial direction force generated at the wheel 302 which is being made to roll, strain is generated at the tires which are not rolling, and the vehicle body is displaced slightly such that the positional angle of the wheel 302 which is rolling varies with respect to the tire driving surface 136. However, the above-described vehicle body orientation adjustment processing is carried out periodically even when the wheel 302 is being rolled. The tire driving devices 118 are moved such that, even if the position of the vehicle body is displaced due to the strain of the tires which are not being rolled, the positional angle, with respect to the tire driving surface 136, of the rolling wheel 302 can be maintained in a state which is the same as that when the position of the vehicle is not displaced. Thus, the positional angle of the rolling wheel 302 with respect to the tire driving surface 136 is kept constant, and the precision of measuring by the wheel alignment measurement processing is improved.

Next, wheel alignment measurement processing will be described with reference to the flowchart of FIG. 16.

In step 1120, for the three wheels 302 other than the wheel 302 which is the object of measurement, the corresponding wheel stopping plates 194F, 194B are rotated such that these three wheels are locked and do not move in the vehicle longitudinal direction.

In the wheel alignment adjusting device 10 of the present embodiment, the wheels 302 are fixed merely by the wheel stopping plates 194F, 194B being rotated and being made to abut the wheels 302. Namely, fixing of the vehicle 300 is easy. Further, as compared with a case in which fixing is carried out by clamping to a suspension device or the like, the structure of the fixing device itself is simple. Operation is also simple.

In subsequent step 1122, the tire driving device 118 corresponding to the wheel 302 which is the object of measurement is driven to circulate.

In this way, the tire 302 which is the object of measuring is made to roll on the tire driving surface 136. The tire 302 which is the object of measuring repeats the actions of riding up from the top surfaces of the plate members 132 onto the top surface of the protruding portion, and coming down off from the top surface of the protruding portion onto the top surfaces of the plate members 132.

Due to this riding up onto the protruding portion and coming down off of the protruding portion, a longitudinal force Fx (circulating direction force), a lateral force Fy (circulating axial direction force) and a load Fz (force in the direction orthogonal to the tire driving surface) are generated at the wheel 302 which is the object of measurement. In the present embodiment, among these three forces, the longitudinal force Fx and the lateral force Fy are measured by the force sensors 152.

As a result, in step 1124, the outputs from the force sensor 152 (the measured values of the longitudinal force Fx and the lateral force Fy) are sampled, and the measured values of the longitudinal force Fx and the lateral force Fy obtained by sampling are stored in a storing means such as a memory or the like.

In next step 1126, a determination is made as to whether measurement for the wheel 302 which is the object of measurement has been completed.

If the determination is negative, the routine returns to step 1122, and steps 1122 through 1126 are repeated at a relatively short cycle.

In this way, until the determination in step 1126 becomes positive, the longitudinal force Fx and the lateral force Fy, which are generated by the wheel 302 which is the object of measurement and which is being rolled on the tire driving surface 136, are successively stored.

When a condition is satisfied, such as when a predetermined period of time has elapsed, or when the tire has been rotated a predetermined number of rotations, or when the amount of measured data stored in the memory has reached a predetermined amount, the determination in step 126 is affirmative, and the routine proceeds to step 1128. (These conditions are set such that continuous measurement of the longitudinal force Fx and the lateral force Fy, during the period from the time the wheel rides up on the protruding portion to the time the wheel comes down off of the protruding portion, is carried out at least one time.)

In step 1128, a determination is made as to whether the above-described measuring processing as been carried out for all of the wheels 302 of the vehicle 300.

When the determination is negative, the routine returns to step 1120, and the above processes are repeated by using another wheel 302 as the wheel which is the object of measurement.

When measurement processing has been carried out for all of the wheels 302 of the vehicle 300 and data on all of the wheels has been collected, the determination in step 1128, is affirmative, and in step 1130, the wheel stopping plates 194F are unlocked. There after, the routine moves on to step 1132.

In step 1132, for each of the wheels 302 of the vehicle 300, the toe angle adjustment direction (whether adjustment should be made in the toe-in direction or the toe-out direction or toe-out direction) is computed.

Computation for a single wheel is carried out as follows.

First, a plurality of measured values of the longitudinal force Fx and the lateral force Fy of the wheel which is the object of processing are fetched from the measured values of the longitudinal force Fx and the lateral force Fy which are stored and accumulated in the storing means.

Next, for each of the measured values of the longitudinal force Fx, the first-order derivative with respect to time (dFx/dt, i.e., the rate of change in the longitudinal force Fx) is computed.

Figure 19:
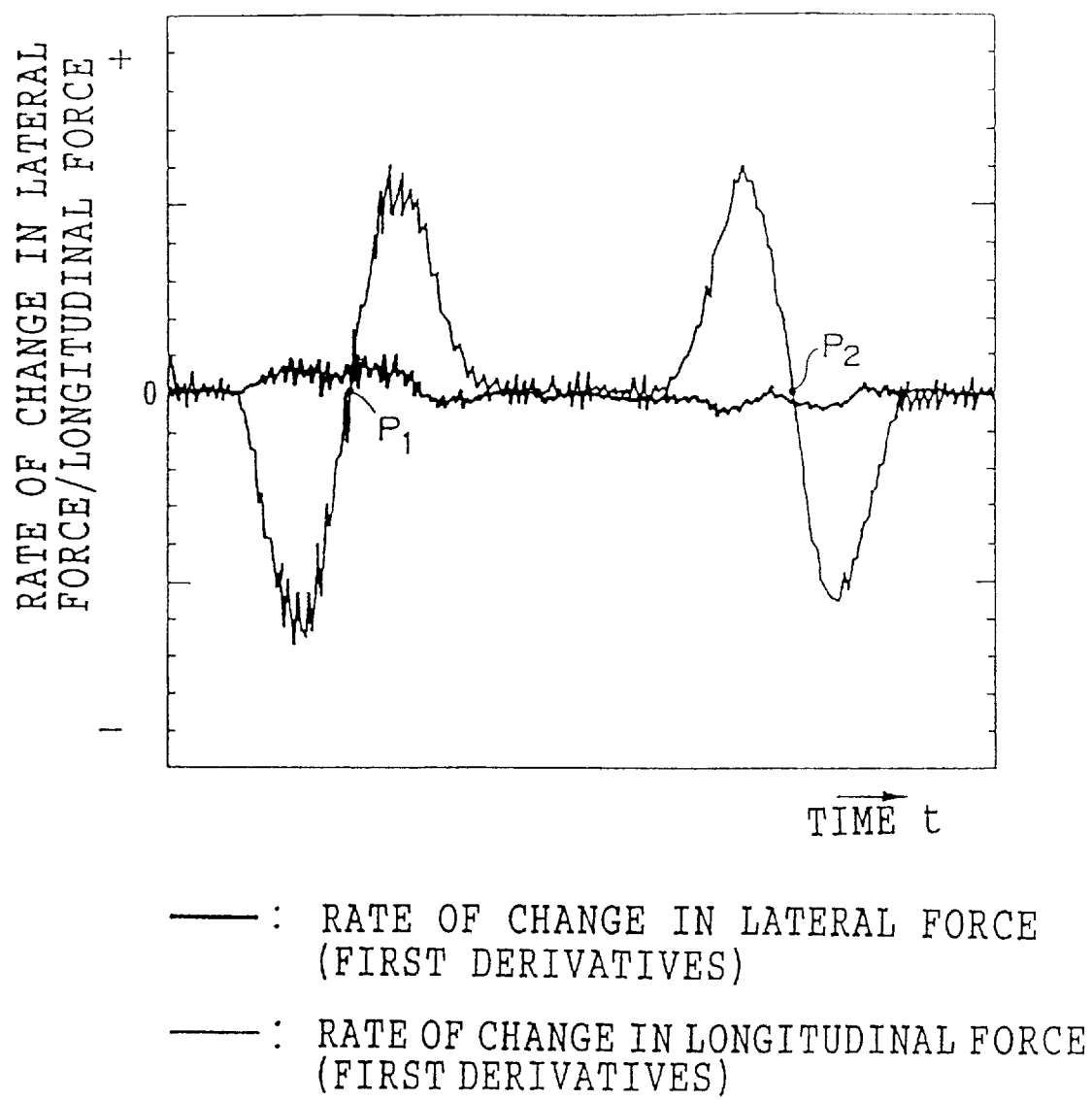
FIG. 19 is a graph illustrating an example of progress of first order derivatives of longitudinal force generated at a tire and first order derivatives of lateral force generated at a tire, in a case in which a wheel successively passes over an up-step and a down-step.

When the data of the first-order derivatives (dFx/dt) of the longitudinal force obtained by computation is plotted along a time axis, a waveform such as, for example, that illustrated by the thin solid line in FIG. 19 is obtained.

Next, from the series of data of the first-order derivatives (dFx/dt) of the longitudinal force, a series of data corresponding to the time the wheel passes over a step (an up-step and a down-step) is extracted.

As is clear from FIG. 19, when the wheel passes over a step, the tire greatly deforms. In this way, characteristic fluctuation patterns, in which there are two continuous large fluctuations having different plus/minus signs and amplitudes of a predetermined value or more, occur in the first-order derivatives (dFx/dt) of the longitudinal force.

Further, after a fluctuation in the negative direction when the wheel passes over an up-step, there is a fluctuation in the positive direction. After a fluctuation in the positive direction when the wheel passes over a down-step, there is a fluctuation in the negative direction.

Accordingly, extraction of data corresponding to the time the wheel passes over an up-step and the time the wheel passes over a down-step is realized, for example, as follows. Data, whose absolute value is a predetermined value or greater, is extracted from the data of the first-order derivatives (dFx/dt) of the longitudinal force. The extracted data is considered to be data of a peak of a fluctuation caused by the wheel passing over a step, or data in a vicinity of such a peak. If, in the series of data including this data and obtained by measurement within a predetermined time, there is a fluctuation pattern characteristic of passing over an up-step or a fluctuation pattern characteristic of passing over a down-step, this series of data is extracted as data for the time of the wheel passing over an up-step or data for the time of the wheel passing over a down-step.

Next, from the data at the time the wheel passes over an up-step which was extracted by the above process, the time (first time) at which the (absolute value of the) first-order derivative of the longitudinal force is a minimum after the first of the two fluctuations forming the characteristic fluctuation pattern has occurred, is determined. (Namely, the time at which the absolute value of the longitudinal force is a maximum is determined. This is the time corresponding to point $P_1$ in FIG. 19.)

Specifically, for example, from the extracted series of data, data which is the boundary between the change in the plus/minus sign of the first-order derivatives of the longitudinal force is extracted (i.e., data of a point where, the sign of the data before this point and the sign of the data after this point are different, is extracted). The measured time of this data is determined to be the time at which the (absolute value of the) first-order derivative of the longitudinal force is a minimum.

Next, from the data at the time the wheel passes over a downstep, the time at which the (absolute value of the) first-order derivative of the longitudinal force is a minimum after the first of the two fluctuations forming the characteristic fluctuation pattern has occurred, is determined in the same way as the first time. (Namely, the time at which the absolute value of the longitudinal force is a maximum is determined. This is the time corresponding to point $P_2$ in FIG. 19.)

Then, from the measured values of the lateral force Fy fetched from the storing means, the measured values of the lateral force Fy which were measured in the period of time from the first time to the second time are extracted, and their first-order derivatives with respect to time (dFy/dt, i.e., rate of change in lateral force Fy) are respectively compared.

When the data of the first-order derivatives (dFy/dt) of the lateral force obtained by computation is plotted along a time axis, a waveform such as that illustrated by the thick solid line in FIG. 19, for example, is obtained.

Next, the energy of the fluctuation in the lateral force Fy during a predetermined time period is computed. In the present embodiment, the sum of squares E of the first-order derivatives (dFy/dt) of the lateral force (see following formula) are computed as the energy of the fluctuation in the lateral force Fy.

$$E=\Sigma(dFy/dt)^2$$

Then, on the basis of the computed energy of the fluctuation in the lateral force Fy (i.e., the sum of squares E of the first-order derivatives of the lateral force), the toe angle adjustment direction for decreasing the energy of the fluctuation in the lateral force (i.e., whether adjustment should be carried out in the toe-in direction or in the toe-out direction) is computed.

The optimal toe angle is the angle at which the sum of squares E (the energy of the fluctuation in the lateral force) becomes a minimum. In order to determine the toe angle at which the sum of squares E is a minimum, for each wheel, the longitudinal force Fx (or the load Fz) and the lateral force Fy must be repeatedly measured while varying the toe angle, and it is difficult to determine the direction of adjustment of the toe angle from the value of the sum of squares E obtained by a single measurement.

Thus, it is preferable that the adjustment direction be computed by also using the sum of the first-order derivatives of the lateral force (see following formula).

$$S=\Sigma dFy/dt$$

The toe angle when the above sum S=0 does not always correspond with the toe angle at which the sum of squares E is a minimum, but is an angle which is close to the toe angle at which the sum of squares E is a minimum. Thus, by computing the adjustment direction of the toe angle by also using the sum S of the first-order derivatives of the lateral force (e.g., by determining the adjustment direction on the basis of the sum S when the adjustment direction cannot be determined from the sum of squares E), there are cases in which the number of times the longitudinal direction force Fx (or the load Fz) and the lateral force Fy are measured are reduced.

In step 1132, by repeating the above processes for each of the wheels of the vehicle, the direction of adjustment of the toe angle is computed for each of the wheels.

In subsequent step 1134, the computed energy of the fluctuation in the lateral force Fy (i.e., the sum of squares E of the first-order derivatives of the lateral force) and the adjustment direction of the toe angle are displayed for each of the wheels on the display device 126A, and processing is temporarily completed. In this way, on the basis of the information displayed on the display device 126A, the operator can easily determine whether adjustment of the toe angles of the respective tires is required, and if the toe angle must be adjusted, in what direction and to what extent the toe angle should be adjusted.

Further, after the operator has adjusted the toe angle of each of the wheels of the vehicle 300, if reconfirmation is necessary, the operator may again instruct that the above wheel alignment measurement processing be carried out. In the same way as above, a determination can be made again, on the basis of the longitudinal force and the lateral force, as to whether the wheel alignment after toe angle adjustment has been carried out is appropriate.

In this way, regardless of the type of the tires mounted to the vehicle 300, the positional angle of each of the wheels of the vehicle 300 can be adjusted appropriately such that good traveling stability on actual road surfaces can be obtained in accordance with the characteristics of the tires and such that resistance to irregular wear can be improved.

(6) When the vehicle 300 is raised up in order to carry out adjustment of the vehicle 300 or the like, the motor unit 30 is driven.

Figure 20:
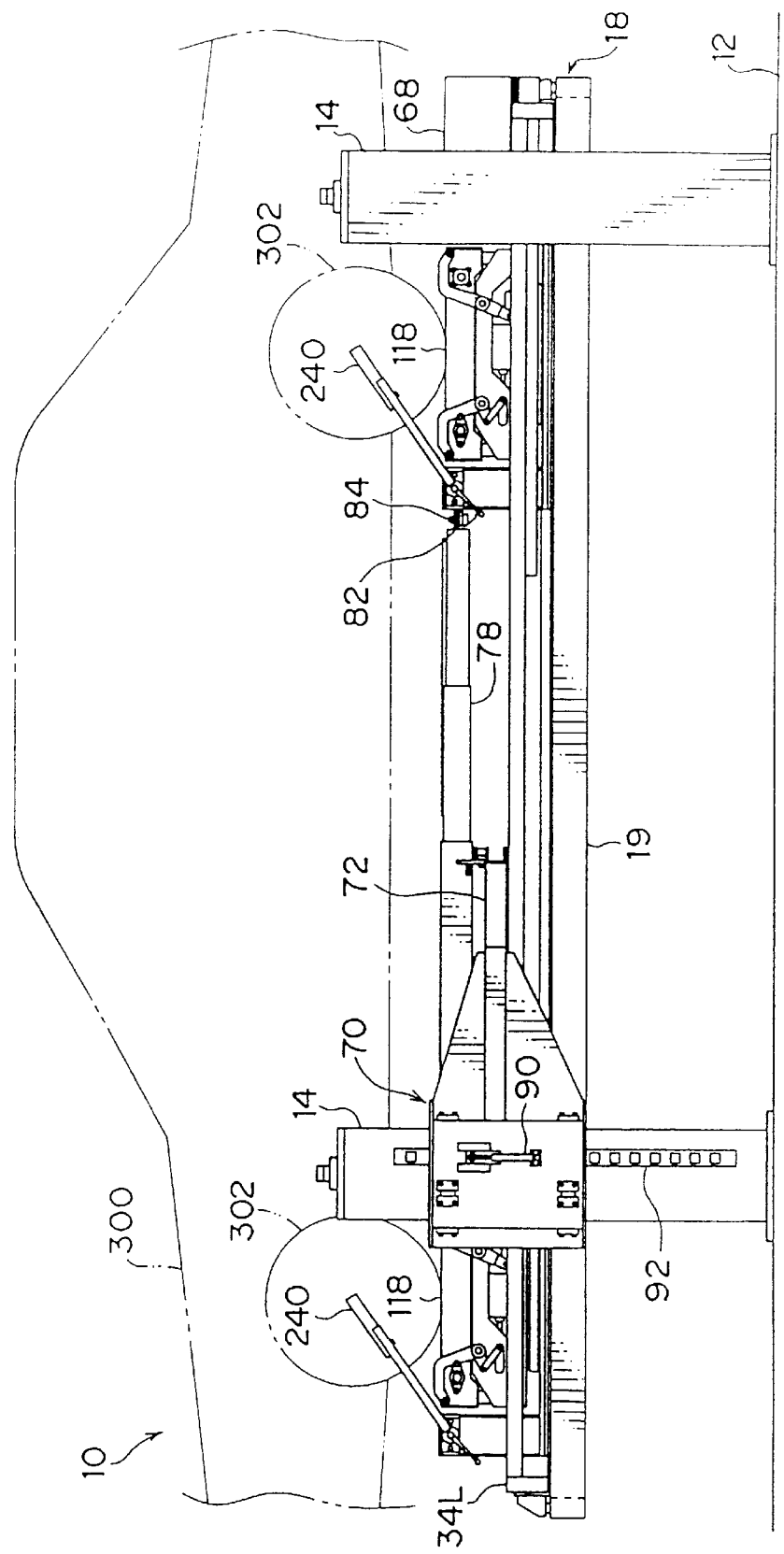
FIG. 20 is a side view as seen from the left side of the wheel alignment adjusting device, and illustrates a state in which the vehicle body is raised up.

When the motor unit 30 is driven and the chain 26 is driven in a predetermined direction, the sprockets 24 and the rotating members 22 of the respective supporting pillars 14 are rotated simultaneously. The loading stand 18 and the second sub-base 70 loaded on the loading stand 18 are integrally raised along the vertical feed screws 16. In this way, as illustrated in FIG. 20, a work space for a worker is formed beneath the loading stand 18.

(7) When the tires of the vehicle are to be changed, processes are carried out as follows.

(A) After the loading stand 18 and the second sub-base 70 are raised as described above, the loading stand 18 is lowered with the second sub-base 70 locked to the supporting pillars 14 by the lock devices 90 (see FIG. 1).

Usually, the air cylinders 102 urge the lock levers 96, by air pressure, in the directions in which the lower ends 96A of the lock levers 96 contact the lock plates 92. Thus, when the loading stand 18 is lowered, the lower ends 96A of the lock levers 96 enter into the square holes 94 and catch on the lower ends 94A (the state in FIG. 10). The lowering of the second sub-base 70 is stopped, and only the loading stand 18 is lowered.

If the lower ends 96A are inserted into the square holes 94, the lower ends 96A catch on the lower ends of the square holes 94. If the lower ends 96A of the lock levers 96 are not in the square holes 94, after the lower ends 96A are inserted into the square holes 94 therebeneath, the lower ends 96A catch on the lower ends of these square holes 94, and the lowering of the second sub-base 70 is thereby prevented.

(B) When driving of the motor unit 30 is continued, only the loading stand 18 is lowered. The lower surface of the vehicle body of the vehicle 300 abuts the upper surfaces of the second transfer plates 78 of the second sub-base 70, and the vehicle 300 is supported in a state of being disposed on the second sub-base 70. As is shown by the imaginary lines in FIG. 1, the tire driving devices 118 are separated from the wheels 302, and the tires can be changed in this state.

In this way, in the wheel alignment adjusting device 10 of the present embodiment, as described above, the second sub-base 70 is locked and only the loading stand 18 is lowered. Thus, the state can be changed from the state in which the second transfer plates 78 are loaded on the loading stand 18 to the state in which the second transfer plates 78 are separated from the loading stand 18. Therefore, when the tires are being changed, there is no need for a separate jack or a separate rigid rack, and changing of tires can be carried out easily.

After the tires have been changed, if alignment adjustment of the vehicle 300 is to be carried out or the vehicle 300 is to be taken off of the device, the loading stand 18 is raised and the second sub-base 70 is raised up slightly (by an amount that enables the lower ends 96A of the lock levers 96 to separate upward from the lower ends of the square holes 94). The air cylinders 102 are operated, and the lower ends 96A of the lock levers 96 move apart from the lock plates 92. In this way, the wheels of the vehicle 300 are loaded on the tire driving devices 118, and the vehicle body moves apart from the second sub-base 70.

Then, when the loading stand 18 is lowered with the lower ends 96A of the lock levers 96 separated from the lock plates 92, the second sub-base 70 is lowered together with the loading stand 18 while being disposed on the top surface of the loading stand 18.

After lowering has been completed, the air cylinders 102 are operated such that the lock levers 96 are urged in the directions in which the lower ends 96A of the lock levers 96 contact the lock plates 92.

In the distance measuring device 240 of the present embodiment, a fixed pulley and a running pulley are combined such that the second wire 544 for measurement is folded over compactly between them. Thus, the second wire 544 for measurement can be accommodated at a dimension which is shorter than the pulled-out dimension, and the overall length of the distance measuring device 240 can be made shorter.

Further, by mounting the jig 304 to the disk wheel flange 302A, a position at the axial center of the wheel 302 becomes the reference for measurement of the dimensions. Thus, dimensions can be measured precisely and accurately.

Another Embodiment

In the above-described embodiment, the orientation of the vehicle 300 is corrected by detecting the positions of the wheels 302 by using the distance measuring devices 240. When the toe angle, the camber angle or the like is to be corrected, the wheel 302 is inclined such that the distance to the wheel 302 (the pulled-out amount of the second wire 544 for measurement) is changed. Thus, the amount of change in the angle of the wheel 302 (the corrected angle) can be determined by calculation using a trigonometric function, from the amount of change in the distance to the wheel 302.

Further, by increasing the number of running pulleys (the pulley 532A and the pulley 532B) of the distance measuring device 240, the pulled-out amount of the second wire 544 for measurement can be increased, or the length of the distance measuring device 240 can be made shorter.

Further, from the standpoint of stability, stainless wires are preferably used for the first wire 450 for measurement and the second wire 544 for measurement. However, another material may be used provided that it does not stretch due to tension spring 528 such that the precision of measurement deteriorates, and provided that it is difficult for the material to change over the years.

As described above, in accordance with the tire position detecting device of the first aspect, the position of a wheel can be detected precisely and with high accuracy.

In accordance with the position detecting device of the second aspect, because the reference for measurement is clear, a position of a wheel can be detected precisely and with high accuracy.

In accordance with the tire position detecting device of the third aspect, because the wire can be freely bent, it is easy to accommodate the wire compactly within the distance measuring device, and the distance measuring device can be made compact.

In accordance with the tire position detecting device of the fourth aspect, the pulled-out amount of the wire can be measured precisely and accurately.

In accordance with the tire position detecting device of the fifth aspect, because the amount of movement of the wire is converted into a signal, control by a computer or the like is easy.

In accordance with the wheel alignment adjusting device of the sixth aspect, the position of a vehicle body can be corrected automatically.

In accordance with the wheel alignment adjusting device of the seventh aspect, the central line of a vehicle body and the central line of the wheel alignment adjusting device can automatically be made to coincide with one another.

What is claimed is:

1. A tire position detecting device comprising:
   a wheel-mounted jig which is mounted to a disc wheel of a wheel; and
   a position measuring device provided at a wheel loading portion on which the wheel is loaded, said position measuring device including:
   a connecting member, one end of the connecting member being pulled out from a predetermined position of a distance measuring device and being connected to a predetermined position of the wheel-mounted jig; and
   a sensor which measures a pulled out amount of the connecting member; and
   wherein the position measuring device has a first case and a second case, and one longitudinal direction end portion of the first case is fixed to a predetermined position of the wheel loading portion such that the first case is rotatable about the one longitudinal end portion, and the first case supports the second case such that the second case is movable in a longitudinal direction of the first case.

2. A tire position detecting device according to claim 1, wherein the predetermined position of the wheel-mounted jig is on an axis of the wheel.

3. A tire position detecting device according to claim 1, wherein the connecting member is a wire.

4. A tire position detecting device according to claim 3, wherein the sensor is a rotary encoder having a rotational shaft around which the wire is trained and which rotates due to movement of the wire, the rotary encoder outputting a signal corresponding to an amount of movement of the wire.

5. A tire position detecting device according to claim 3, wherein the position measuring device further includes:
   a pull out opening from which the wire is pulled out;
   an anchoring portion on which another end portion of the wire is anchored;
   at least one running pulley, a portion of the wire between the pull out opening and the anchoring portion being trained around the running pulley; and
   an urging device which urges the running pulley in one direction such that tensile force is applied to the wire.

6. A tire position detecting device according to claim 5, wherein the pull out opening can be moved onto an axis of the wheel.

7. A tire position detecting device according to claim 1, wherein the second case includes:
   a pull out opening from which the wire is pulled out;
   an anchoring portion on which another end portion of the wire is anchored;
   at least one running pulley, a portion of the wire between the pull out opening and the anchoring portion being trained around the running pulley; and
   an urging device which urges the running pulley in one direction such that tensile force is applied to the wire.

8. A wheel alignment adjusting device comprising:
   a wheel-mounted jig which is mounted to a disc wheel of a wheel;
   a position measuring device provided at a wheel loading portion on which the wheel is loaded, said position measuring device including:
   a connecting member, one end of the connecting member being pulled out from a predetermined position of a distance measuring device and being connected to a predetermined position of the wheel-mounted jig; and a sensor which measures a pulled out amount of the connecting member;

a moving device which moves the wheel loading portion in a horizontal direction;

a rotation device provided at the wheel loading portion and rotating the wheel;

a force sensor connected to the wheel loading portion and measuring a force which is applied to the wheel loading portion, and wherein the position measuring device has a first case and a second case, and one longitudinal direction end portion of the first case is fixed to a predetermined position of the wheel loading portion such that the first case is rotatable about the one longitudinal end portion, and the first case supports the second case such that the second case is movable in a longitudinal direction of the first case.

9. A wheel alignment adjusting device according to claim 6, further comprising a control means for controlling the moving device to move the wheel loading portion on which a vehicle left front wheel is loaded and the wheel loading portion on which a vehicle right front wheel is loaded such that a pulled out amount of the connecting member measured by the distance measuring device corresponding to the vehicle right front wheel and a pulled out amount of the connecting member measured by the distance measuring device corresponding to the vehicle left front wheel are the same, and for controlling the moving device to move the wheel loading portion on which a vehicle left rear wheel is loaded and the wheel loading portion on which a vehicle right rear wheel is loaded such that a pulled out amount of the connecting member measured by the distance measuring device corresponding to the vehicle right rear wheel and a pulled out amount of the connecting member measured by the distance measured device corresponding to the vehicle left rear wheel are the same.

* * * * *